US012710682B2

(12) United States Patent
Li et al.

(10) Patent No.: US 12,710,682 B2
(45) Date of Patent: Aug. 18, 2026

(54) VARIABLE APERTURE, CAMERA MODULE, AND ELECTRONIC DEVICE

(71) Applicant: Huawei Technologies Co., Ltd., Shenzhen (CN)

(72) Inventors: Dengfeng Li, Dongguan (CN); Xiangyang Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

(21) Appl. No.: 18/557,839

(22) PCT Filed: Apr. 20, 2022

(86) PCT No.: PCT/CN2022/087949
§ 371 (c)(1),
(2) Date: Oct. 27, 2023

(87) PCT Pub. No.: WO2022/228238
PCT Pub. Date: Nov. 3, 2022

(65) Prior Publication Data

US 2024/0219809 A1 Jul. 4, 2024

(30) Foreign Application Priority Data

Apr. 29, 2021 (CN) ......................... 202110475918.1

(51) Int. Cl.
*G03B 9/06* (2021.01)
*G03B 30/00* (2021.01)

(52) U.S. Cl.
CPC ............... *G03B 9/06* (2013.01); *G03B 30/00* (2021.01)

(58) Field of Classification Search
CPC .................................... G03B 9/02; G03B 9/06
See application file for complete search history.

(56) References Cited

U.S. PATENT DOCUMENTS

2019/0121219 A1 4/2019 Hwang et al.
2019/0373145 A1 * 12/2019 Yu .......................... G02B 7/102
2020/0026149 A1 * 1/2020 Jun .......................... G03B 9/06
2020/0200154 A1 * 6/2020 Howarth ............. F03G 7/06143
2022/0349392 A1 * 11/2022 Citro ................... F03G 7/06143
2024/0088748 A1 * 3/2024 Bian ...................... H02K 11/20

FOREIGN PATENT DOCUMENTS

CN 110554547 A 12/2019
CN 115268173 B 7/2023
JP 2001147459 A 5/2001

* cited by examiner

*Primary Examiner* — Noam Reisner
(74) *Attorney, Agent, or Firm* — Slater Matsil, LLP

(57) ABSTRACT

A variable aperture, a camera module, and an electronic device are provided. The variable aperture includes a base, a fixed plate connected to the base, a rotation plate disposed around the fixed plate, a plurality of blades rotatively connected to the fixed plate and the rotation plate, a first SMA wire, and a second SMA wire. The first SMA wire or the second SMA wire is configured to shrink when power is on, to drive the rotation plate to rotate relative to the fixed plate. Each of the blades rotates relative to the fixed plate and slides relative to the rotation plate, so that an aperture of the aperture hole changes.

20 Claims, 16 Drawing Sheets

VARIABLE APERTURE, CAMERA MODULE, AND ELECTRONIC DEVICE

CROSS-REFERENCE TO RELATED APPLICATIONS

This application is a national stage of International Application No. PCT/CN2022/087949, filed on Apr. 20, 2022, which claims priority to Chinese Patent Application No. 202110475918.1, filed on Apr. 29, 2021. Both of the aforementioned applications are hereby incorporated by reference in their entireties.

TECHNICAL FIELD

This application relates to the field of photographing technologies, and in particular, to a variable aperture, a camera module, and an electronic device.

BACKGROUND

A conventional camera module is provided with a variable aperture. A size of an aperture hole of the variable aperture may be changed to adjust light intensity of incident light. This improves imaging quality of the camera module to a large extent. In an existing variable aperture, blades are mainly driven by a voice coil motor (voice coil motor, VCM) to adjust a size of an aperture hole. Because the voice coil motor is prone to being interfered with by electromagnetic waves, aperture adjustment precision of the aperture hole of the variable aperture is low.

SUMMARY

This application provides a variable aperture, a camera module, and an electronic device, to implement high aperture adjustment precision of an aperture hole of the variable aperture.

According to a first aspect, this application provides a variable aperture, including a base, a fixed plate, a rotation plate, a plurality of blades, a first SMA wire, and a second SMA wire. The base is provided with a through hole. The fixed plate is fixedly connected to the base. The fixed plate is in a ring shape, and an inner through hole of the fixed plate is disposed opposite to the through hole. The rotation plate is rotatively connected to the base and disposed around the fixed plate. The plurality of blades are located on a same side of the fixed plate and the rotation plate. The plurality of blades are annularly distributed and enclose an aperture hole. The aperture hole is disposed opposite to the through hole. Each of the blades is rotatively connected to the fixed plate and slidably connected to the rotation plate. One end of each of the first SMA wire and the second SMA wire is connected to the base, and the other end is connected to the rotation plate. The first SMA wire or the second SMA wire is configured to shrink when power is on, to drive the rotation plate to rotate relative to the fixed plate. Each of the blades rotates relative to the fixed plate and slides relative to the rotation plate, so that an aperture of the aperture hole changes. A direction in which the first SMA wire shrinks to drive the rotation plate to rotate is opposite to a direction in which the second SMA wire shrinks to drive the rotation plate to rotate.

In this application, the variable aperture drives, by using the first SMA wire or the second SMA wire, the rotation plate to rotate relative to the fixed plate, so that the plurality of blades are closed or opened, and the aperture of the aperture hole changes. Compared with a conventional voice coil motor, a driving mechanism of the variable aperture is not prone to being interfered with by electromagnetic waves, so that aperture adjustment precision of the aperture hole of the variable aperture is high, and reliability is high.

In addition, because components of the driving mechanism for driving by using the SMA wire are small in size and arranged compactly, compared with the conventional voice coil motor, the variable aperture may narrow space in a length direction and a width direction. This facilitates miniaturization of the variable aperture. The length direction and the width direction are perpendicular to each other, and both are perpendicular to a center line of the aperture hole.

In some possible implementations, the variable aperture further includes a first flipping block. The first flipping block includes a rotation part, a first connection part, and a second connection part. The rotation part is rotatively connected to the base, the first SMA wire is connected to the first connection part, and the rotation plate is connected to the second connection part. The first SMA wire shrinks to drive the first connection part to rotate about the rotation part, so that the second connection part rotates about the rotation part and flips the rotation plate to rotate relative to the fixed plate.

The variable aperture further includes a second flipping block. The second flipping block is rotatively connected to the base. The second SMA wire is connected to the second flipping block. The second flipping block is further connected to the rotation plate.

In this implementation, the first flipping block is linked to the rotation plate, and the first SMA wire is connected to the rotation plate through the first flipping block. The second flipping block is linked to the rotation plate, and the second SMA wire is connected to the rotation plate through the second flipping block. Therefore, one end of each of the first SMA wire and the second SMA wire is connected to the base, and the other end is connected to the rotation plate. For example, the first SMA wire shrinks to drive the first rotation block to rotate, the first flipping block flips the rotation plate to rotate relative to the base, the second flipping block is driven by the rotation plate to rotate, and the second SMA wire is stretched. Similarly, the second SMA wire shrinks to drive the rotation plate to rotate in another direction, and the first SMA wire is stretched.

The first flipping block may further include a flipping block body, and the flipping block body includes a top surface and a bottom surface that are disposed back to each other. The rotation part is convexly disposed on the bottom surface of the flipping block body, and the rotation part may include a rotation column. The first connection part is convexly disposed on the top surface of the flipping block body, and the first connection part may include a support table and a connection column convexly disposed on a top surface of the support table. The second connection part may be formed on a side surface of the flipping block body, and the side surface of the flipping block body is located between the top surface of the flipping block body and the bottom surface of the flipping block body.

The variable aperture further includes a first claw, a second claw, a third claw, and a fourth claw. Two ends of the first SMA wire are separately connected to the first claw and the second claw, and two ends of the second SMA wire are separately connected to the third claw and the fourth claw. The first claw is installed on the base, so that one end of the first SMA wire is connected to the base. The second claw is connected to the first connection part of the first flipping block, so that the other end of the first SMA wire is connected to the rotation plate through the first flipping block. The third claw is installed on the base, so that one end of the second SMA wire is connected to the base. The fourth claw is connected to the second flipping block, so that the other end of the second SMA wire is connected to the rotation plate through the second flipping block.

In some possible implementations, the second connection part is engaged or in interference fit with the rotation plate. For example, the second connection part includes a gear structure, the rotation plate includes a gear structure, and the gear structure of the second connection part is engaged with the gear structure of the rotation plate.

In some possible implementations, a spacing between the first connection part and the rotation part is less than a spacing between the second connection part and the rotation part. It may be understood that an aperture hole of a variable aperture of a conventional voice coil motor is likely to change slightly because magnetic forces of a magnet and a coil have upper limits. In other words, a change range of the aperture hole of the conventional variable aperture is limited. However, in this application, the variable aperture is driven by using the first SMA wire or the second SMA wire, and an aperture change range of the aperture hole of the variable aperture is not affected by magnetic forces of a magnet and a coil. In addition, because the spacing between the first connection part and the rotation part of the first flipping block is less than the spacing between the second connection part and the rotation part, the first flipping block can implement a travel expansion. When a shrinkage length of the first SMA wire is small, the first flipping block can flip the rotation plate to rotate relative to the fixed plate by a large angle, so that a rotation angle of the blades is large, and an aperture change of the aperture hole is large. The second flipping block can also implement a travel expansion, so that the aperture change range of the aperture hole of the variable aperture is large. This helps improve photographing quality and enrich a photographing scenario of a camera module in which the variable aperture is used.

In some possible implementations, the first connection part and the second connection part are separately located on two sides of the rotation part. For example, the flipping block body may be approximately in a sector shape, the first connection part may be fastened to a circle center of the flipping block body or disposed near the circle center, the second connection part may be fastened to an outer cambered surface (namely, a side surface) of the flipping block body, and the rotation part is fastened between the circle center and the outer cambered surface of the flipping block body.

In some possible implementations, the variable aperture further includes a reset spring, and the reset spring is connected to the first connection part and the base. Because the variable aperture is provided with the reset spring, the reset spring can reset the blades after power-off. Therefore, the variable aperture does not need to be additionally powered on, and power consumption can be reduced, so that power consumption of the variable aperture is low.

For example, two ends of the reset spring may be separately connected to the first flipping block and the second flipping block, and a middle part of the reset spring is connected to the base. In some other implementations, the reset spring may alternatively include two parts independent of each other. One part is connected to the first flipping block and the base, and the other part is connected to the second flipping block and the base.

Two ends of the reset spring may be separately connected to the second claw and the fourth claw. The reset spring, the second claw, and the fourth claw may be an integrally molded structure.

In some possible implementations, the base includes a bottom plate and an inner ring wall, the bottom plate is annular and surrounds the through hole, the inner ring wall is fastened to an inner circumferential edge of the bottom plate, and the inner ring wall is provided with a first notch. The rotation plate includes a plate body and a first fitting part fastened to one side of the plate body, the plate body is disposed opposite to the bottom plate, and the first fitting part is located in the first notch and fits the second connection part.

In this implementation, the first fitting part and the second fitting part of the rotation plate are arranged by using the notch of the base, to share space with the base, and space utilization of the variable aperture is improved. This facilitates miniaturization of the variable aperture.

In some possible implementations, the fixed plate is fastened to a side that is of the inner ring wall and that backs onto the bottom plate, and the fixed plate covers the first notch, so that the first fitting part and the second fitting part of the rotation plate are limited between the fixed plate and the bottom plate of the base, and the rotation plate can stably rotate between the fixed plate and the base.

In some possible implementations, the variable aperture further includes a first magnetic member and a second magnetic member, the first magnetic member is fastened to the base and is disposed corresponding to the first SMA wire, and the second magnetic member is fastened to the base and is disposed corresponding to the second SMA wire.

For example, the first magnetic member and the second magnetic member may be permanent magnets, so that the first magnetic member attracts the first SMA wire, and the second magnetic member attracts the second SMA wire, to avoid that the SMA wires flutter in a loosened state. Alternatively, the first magnetic member and the second magnetic member may be electromagnets, and are configured to: under control of an electrical signal, attract the first SMA wire and/or the second SMA wire in some time periods, and not attract the first SMA wire and/or the second SMA wire in other time periods.

In some possible implementations, each of the blades includes a first end part and a second end part, the first end part includes a rotation hole and a guide hole that are spaced, the second end part includes a first edge, the first edge and the guide hole are disposed on a same side, and the first edge is a part of a hole wall of the aperture hole. A shape of the first edge may be a straight line, an arc line, a combination of a straight line and an arc line, a combination of a straight line and a straight line, or a combination of an arc line and an arc line.

The fixed plate includes a first fixed column, and the first fixed column is inserted into the rotation hole. The rotation plate includes a second fixed column, and the second fixed column is inserted into the guide hole and capable of sliding in the guide hole. When the rotation plate rotates relative to the fixed plate, the second fixed column slides in the guide hole, the second fixed column drives the blades to rotate about the first fixed column relative to the fixed plate, and the plurality of blades are closed to narrow the aperture hole or opened to enlarge the aperture hole.

The plurality of blades may be stacked into two layers. The blades stacked at a bottom layer may be in contact with the rotation plate and the fixed plate. The blades stacked at a top layer may be in contact with gaskets and the blades stacked at the bottom layer, and are heightened by the gaskets and the blades stacked at the bottom layer.

In some possible implementations, the rotation plate is connected to the base through a roll ball slide rail. For example, the base includes a bottom plate and a plurality of connection parts convexly disposed on a top surface of the bottom plate, and each of the connection parts is provided with a groove. The variable aperture further includes a plurality of roll balls, and the plurality of roll balls are separately installed in the grooves of the plurality of the connection parts. The rotation plate includes a plate body and a plurality of guide parts fastened to one side of the plate body. Each of the guide parts includes a guide groove. An extension track of the guide groove may be an arc, and circle centers of the extension tracks of the guide grooves of the plurality of guide parts coincide. The plate body of the rotation plate is disposed opposite to the bottom plate of the base, the plurality of roll balls are in a one-to-one correspondence with the plurality of guide parts, and each of the roll balls is partially located in the guide groove of a corresponding guide part.

In some possible implementations, the variable aperture further includes a reset spring, and the reset spring is connected to the base and the rotation plate. Because the variable aperture is provided with the reset spring, the reset spring can reset the rotation plate after power-off, and further reset the blades. Therefore, the variable aperture does not need to be additionally powered on, and power consumption can be reduced, so that power consumption of the variable aperture is low.

According to a second aspect, this application further provides a camera module, including a camera lens and the variable aperture according to any one of the foregoing implementations. The variable aperture is fastened to the camera lens, and an aperture hole of the variable aperture is located on a light transmission path of the camera lens.

In this application, because the variable aperture can accurately adjust an aperture size of the aperture hole of the variable aperture, light intensity of incident light emitted into an image sensor of the camera module through the camera lens can be adjusted. This improves imaging quality of the camera module to a large extent.

In some possible implementations, the aperture hole is located on a light inlet side of the camera lens. The camera lens may be partially embedded into the variable aperture, to reduce a size of the camera module in a thickness direction. This facilitates miniaturization.

In some possible implementations, the camera lens includes a first part and a second part that are coaxially disposed, and the aperture hole is located between the first part and the second part. The first part may include a first camera lens barrel and a first lens group installed in the first camera lens barrel, and the second part may include a second camera lens barrel and a second lens group installed in the second camera lens barrel. An optical axis of the second lens group and an optical axis of the first lens group coincide.

In this implementation, the aperture hole of the variable aperture is disposed between the first part and the second part, so that a photographing requirement of the camera module can be better met.

According to a third aspect, this application further provides an electronic device, including an image processor and the camera module according to any one of the foregoing implementations. The image processor is in a communication connection to the camera module, and the image processor is configured to obtain image data from the camera module and process the image data. Because the camera module has high imaging quality, user experience of the electronic device is good.

DETAILED DESCRIPTION OF ILLUSTRATIVE EMBODIMENTS

The following describes technical solutions in embodiments of this application with reference to accompanying drawings. In the descriptions of embodiments of this application, unless otherwise specified, "/" means "or". For example, A/B may represent A or B. In this specification, "and/or" merely describes an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more. The terms "first" and "second" are merely intended for a purpose of description, and shall not be understood as an implication or implication of relative importance or an implicit indication of a quantity of indicated technical features. Therefore, a feature limited by "first" or "second" may explicitly or implicitly include one or more such features.

The orientation terms mentioned in embodiments of this application, for example, "inner", "outer", "side", "top", and "bottom", are merely directions of reference to the accompanying drawings. Therefore, the orientation terms are used to better and more clearly describe and understand embodiments of this application, and are not intended to indicate or imply that a described apparatus or element needs to have a specific orientation or be constructed and operated in a specific orientation. Therefore, the orientation terms cannot be understood as a limitation on embodiments of this application.

In the descriptions of embodiments of this application, it should be noted that unless otherwise specified and limited, the terms such as "installed", "linked", "connected", and "disposed on . . . " should be understood in a broad sense. For example, "connected" may be connected in a detachable manner, or may be connected in a non-detachable manner; and may be directly connected, or may be indirectly connected through an intermediate medium. The "fixedly connected" means connected to each other and a relative position relationship remains unchanged after being connected. The "rotatively connected" means connected to each other and rotating relative to each other after being connected. The "slidably connected" means connected to each other and sliding relative to each other after being connected.

Figure 1:
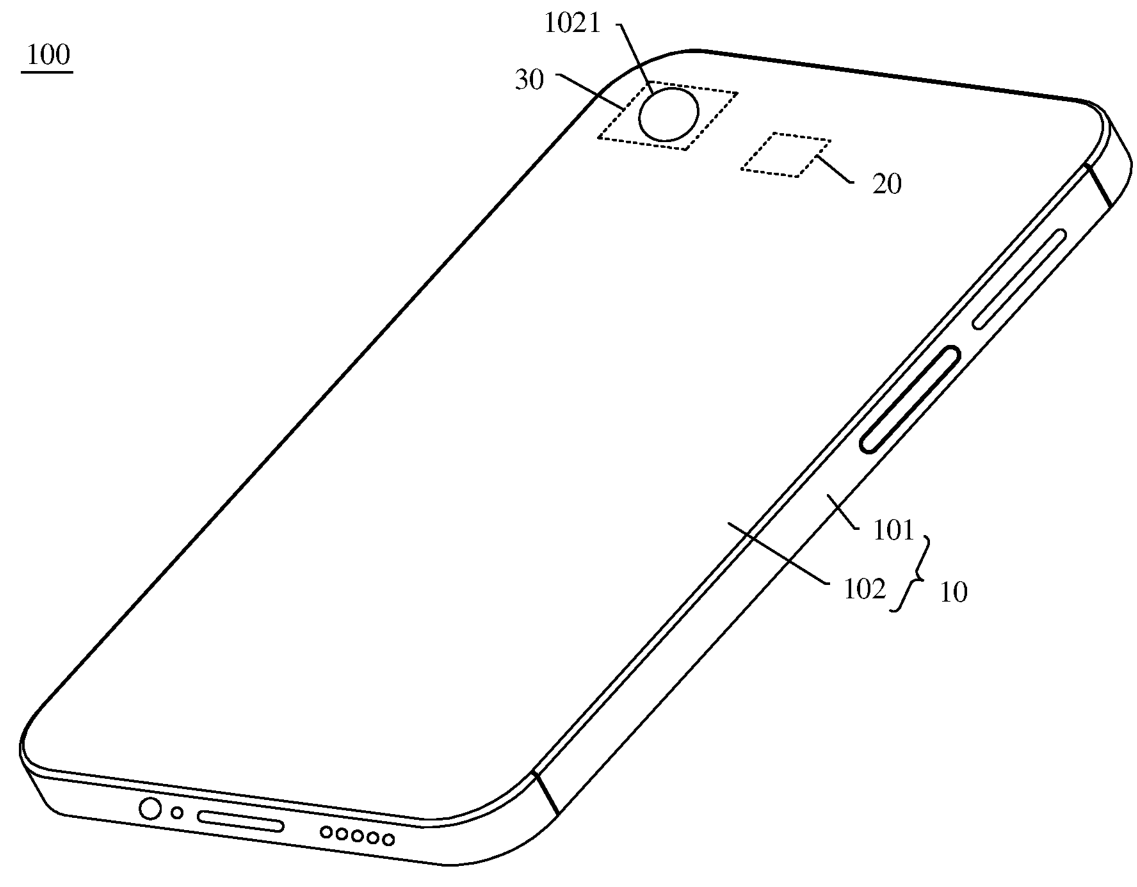
FIG. 1 is a schematic diagram of a structure of an electronic device in some embodiments according to embodiments of this application.

Refer to FIG. 1. FIG. 1 is a schematic diagram of a structure of an electronic device 100 in some embodiments according to embodiments of this application. The electronic device 100 may be a device with a camera module such as a mobile phone, a tablet personal computer (tablet personal computer), a laptop computer (laptop computer), a personal digital assistant (personal digital assistant, PDA), a camera, a personal computer, a notebook computer, a vehicle-mounted device, a wearable device, augmented reality (augmented reality, AR) glasses, an AR helmet, virtual reality (virtual reality, VR) glasses, a VR helmet, or the like. In embodiments shown in FIG. 1, descriptions are provided by using an example in which the electronic device 100 is a mobile phone.

The electronic device 100 includes a housing 10, a display (not shown in the figure), an image processor 20, and a camera module 30. In some embodiments, the housing 10 includes a frame 101 and a rear cover 102. The frame 101 and the rear cover 102 may be an integrally molded structure, or may be assembled to form an integrated structure. The display and the rear cover 102 are separately installed on two sides of the frame 101.

The image processor 20 and the camera module 30 are accommodated on an inner side of the housing 10. The image processor 20 is in a communication connection to the camera module 30. The image processor 20 is configured to obtain image data from the camera module 30 and process the image data. The communication connection between the camera module 30 and the image processor 20 may be implemented in an electrical connection manner such as wiring or in a coupling manner or the like, for data transmission. It may be understood that the communication connection between the camera module 30 and the image processor 20 may alternatively be implemented in another manner for data transmission.

The image processor 20 is configured to: perform optimization processing on a digital image signal through a series of complex mathematical algorithm operations, and finally transmit a processed signal to a display. The image processor 20 may be an image processing chip or a digital signal processing chip. The image processor 20 is configured to: transfer data obtained by a photosensitive chip to a central processing unit quickly and in time, and refresh the photosensitive chip. Therefore, chip quality of the image processor 20 directly affects image quality (for example, color saturation and definition).

In this embodiment, the rear cover 102 is provided with a camera hole 1021, and the camera module 30 may collect light through the camera hole 1021, to serve as a rear-facing camera of the electronic device 100. For example, the rear cover 102 includes a transparent lens, and the transparent lens is installed on the camera hole 1021, to allow light to pass through and to prevent dust and water. In some other embodiments, the camera module 30 may alternatively serve as a front-facing camera of the electronic device 100.

It may be understood that an installation position of the camera module 30 in the electronic device 100 in embodiments shown in FIG. 1 is merely an example, and the installation position of the camera module 30 is not strictly limited in this application. In some other embodiments, the camera module 30 may alternatively be installed in another position of the electronic device 100. For example, the camera module 30 may be installed in the upper middle or the upper right corner of the back of the electronic device 100. In some other embodiments, the electronic device 100 may include a device body and an auxiliary component that can rotate, move, or be detached relative to the device body. The camera module 30 may alternatively be disposed on the auxiliary component.

In some embodiments, the electronic device 100 may further include an analog-to-digital converter (also referred to as an A/D converter, which is not shown in the figure). The analog-to-digital converter is connected between the camera module 30 and the image processor 20. The analog-to-digital converter is configured to: convert a signal generated by the camera module 30 into a digital image signal, and transmit the digital image signal to the image processor 20, then the image processor 20 processes the digital image signal, and finally the display displays an image or a video.

In some embodiments, the electronic device 100 may further include a memory (not shown in the figure). The memory is in a communication connection to the image processor 20. After processing a digital signal of an image, the image processor 20 transmits the image to the memory, so that the image can be found in the memory at any time and displayed on the display when the image needs to be viewed subsequently. In some embodiments, the image processor 20 further compresses a processed digital signal of an image, and then stores a compressed digital signal of the image in the memory to reduce consumption of memory space.

Figure 2:
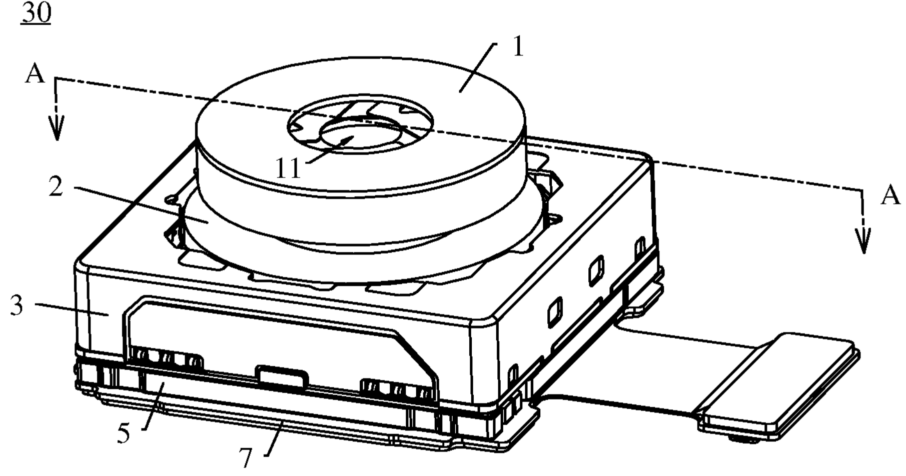
FIG. 2 is a schematic diagram of a structure of a camera module shown in FIG. 1 in some embodiments.
Figure 3:
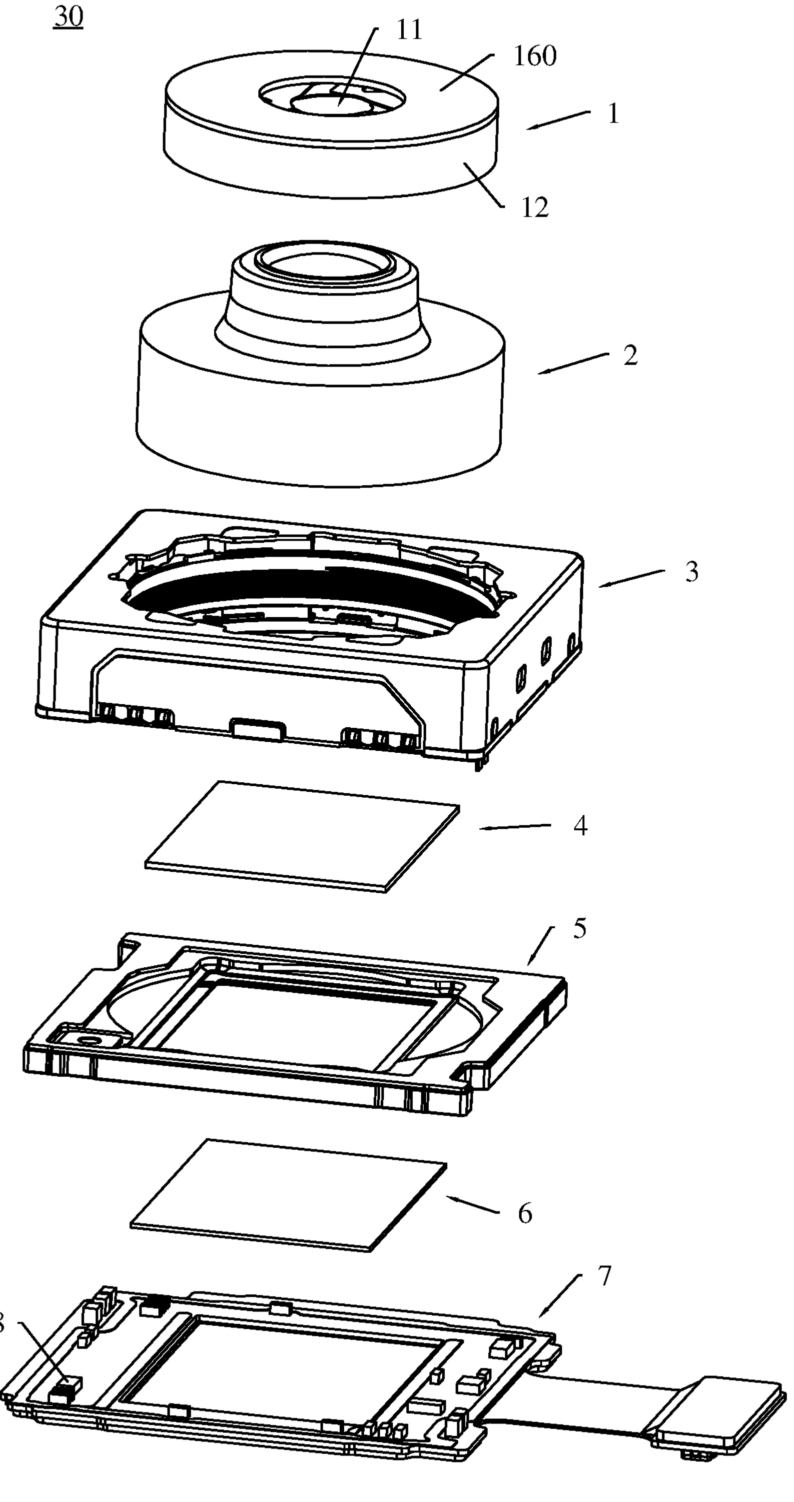
FIG. 3 is a schematic diagram of a partially exploded structure of the camera module shown in FIG. 2.
Figure 4:
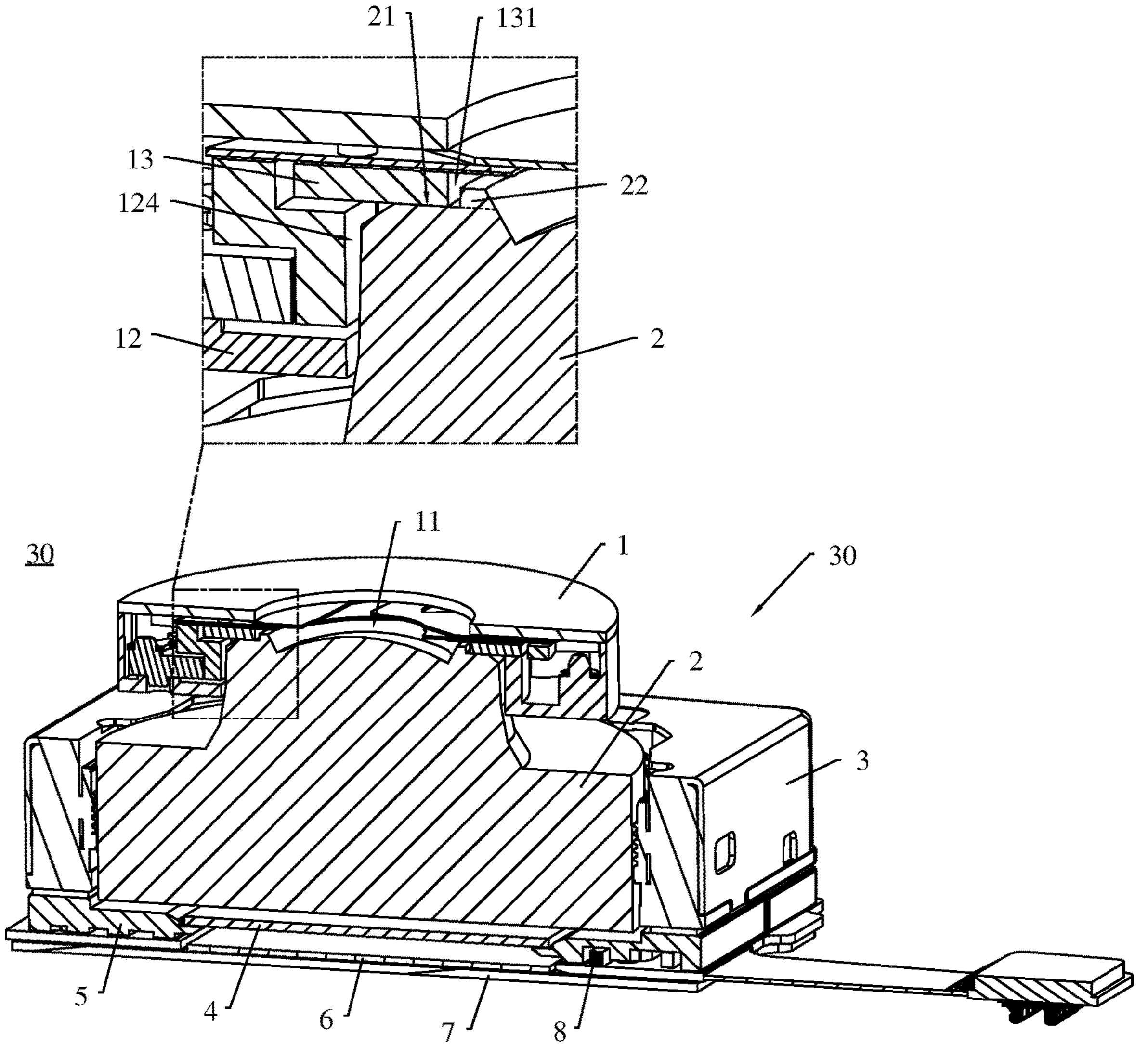
FIG. 4 is a schematic diagram of a cross-sectional structure of the camera module shown in FIG. 2 that is cut in an A-A position.

Refer to FIG. 2 to FIG. 4. FIG. 2 is a schematic diagram of a structure of the camera module 30 shown in FIG. 1 in some embodiments, FIG. 3 is a schematic diagram of a partially exploded structure of the camera module 30 shown in FIG. 2, and FIG. 4 is a schematic diagram of a cross-sectional structure of the camera module 30 shown in FIG. 2 that is cut in an A-A position.

In some embodiments, the camera module 30 includes a variable aperture 1, a camera lens 2, a motor 3, a light filter 4, a holder (holder) 5, an image sensor 6, and a circuit board 7. The holder 5 is fastened to the circuit board 7, and the image sensor 6 is fastened to the circuit board 7 and is located on an inner side of the holder 5. A plurality of elements 8 may be further fastened to the circuit board 7, and the plurality of elements 8 are disposed around the image sensor 6. The motor 3 is installed on the holder 5, and is located on a side that is of the image sensor 6 and that backs onto the circuit board 7. The camera lens 2 is installed on the motor 3, and the motor 3 is configured to drive the camera lens 2 to move or tilt. The motor 3 may be a focus adjustment motor and/or an optical image stabilization motor. The image sensor 6 is located on an image side of the camera lens 2. The light filter 4 is installed on the holder 5, and is located between the camera lens 2 and the image sensor 6. Light can pass through the camera lens 2 to illuminate an imaging surface of the image sensor 6.

For example, an operating principle of the camera module 30 is as follows: The camera lens 2 generates an optical image based on light reflected by a photographed object, and projects the optical image to the imaging surface of the image sensor 6; the image sensor 6 converts the optical image into an electrical signal, namely, an analog image signal, and transmits the electrical signal to the analog-to-digital converter; and the analog-to-digital converter converts the electrical signal into a digital image signal, and sends the digital image signal to the image processor 20.

The image sensor 6 (also referred to as a photosensitive element) is a semiconductor chip. There are hundreds of thousands of to millions of photodiodes on a surface of the image sensor 6, and electric charges are generated when the photodiodes are illuminated by light. The image sensor 6 may be a charge coupled device (charge coupled device, CCD), or may be a complementary metal-oxide semiconductor (complementary metal-oxide semiconductor, CMOS) device. The charge coupled device is made of a highly photosensitive semiconductor material, and can convert light into electric charges. The charge coupled device includes a plurality of photosensitive units that are usually megapixels. When a surface of the charge coupled device is illuminated by light, each of the photosensitive units reflects the electric charges on the device. Signals generated by all the photosensitive units are combined to form a complete image. The complementary metal-oxide semiconductor device is a semiconductor mainly made of two elements, silicon and germanium, so that an N-type semiconductor (carrying negative electrons) and a P-type semiconductor (carrying positive electrons) coexist on the complementary metal-oxide semiconductor device. A current generated by these two complementary effects can be recorded and interpreted into a video by a processing chip.

The camera lens 2 affects imaging quality and imaging effect, and performs imaging mainly according to a refraction principle of a lens. To be specific, light from an object passes through the camera lens 2 to form a clear video on a focal plane, and the image sensor 6 located on the focal plane records the video of the object.

The light filter 4 is configured to: filter out unnecessary light projected onto the image sensor 6, and prevent the image sensor 6 from generating a false color or a ripple, to improve effective resolution and color reproduction of the image sensor 6. For example, the light filter 4 may be, but is not limited to, a blue glass light filter. For example, the light filter 4 may alternatively be a reflective infrared light filter or a dual-pass light filter. The dual-pass light filter may allow both visible light and infrared light in ambient light to pass through, or allow both visible light and another light of a specific wavelength (for example, ultraviolet light) in ambient light to pass through, or allow both infrared light and another light of a specific wavelength (for example, ultraviolet light) to pass through.

In some embodiments, the variable aperture 1 is fastened to the camera lens 2. The variable aperture 1 is provided with an aperture hole 11, an aperture size of the aperture hole 11 is adjustable, and the aperture hole 11 is located on a light transmission path of the camera lens 2. The light transmission path of the camera lens 2 is a path that allows light to pass through. For example, the aperture hole 11 of the variable aperture 1 may be located on a light inlet side of the camera lens 2, and external light enters the camera lens 2 after passing through the aperture hole 11 of the variable aperture 1. An aperture size of the aperture hole 11 of the variable aperture 1 may be changed to adjust light intensity of incident light emitted into the image sensor 6 through the camera lens 2. This improves imaging quality of the camera module 30 to a large extent.

The variable aperture 1 may be configured to increase or decrease a flux of light entering the camera lens 2. For example, when the electronic device 100 performs photographing in a dark light condition, the aperture hole 11 of the variable aperture 1 may be enlarged. In this case, the flux of light entering the camera lens 2 is increased. When the electronic device 100 performs photographing in a sufficient light condition, the aperture hole 11 of the variable aperture 1 may be narrowed. In this case, the flux of light entering the camera lens 2 is decreased.

In some other embodiments, the camera module 30 may not include the motor 3, and the camera lens 2 is fastened to the holder 5.

Figure 5:
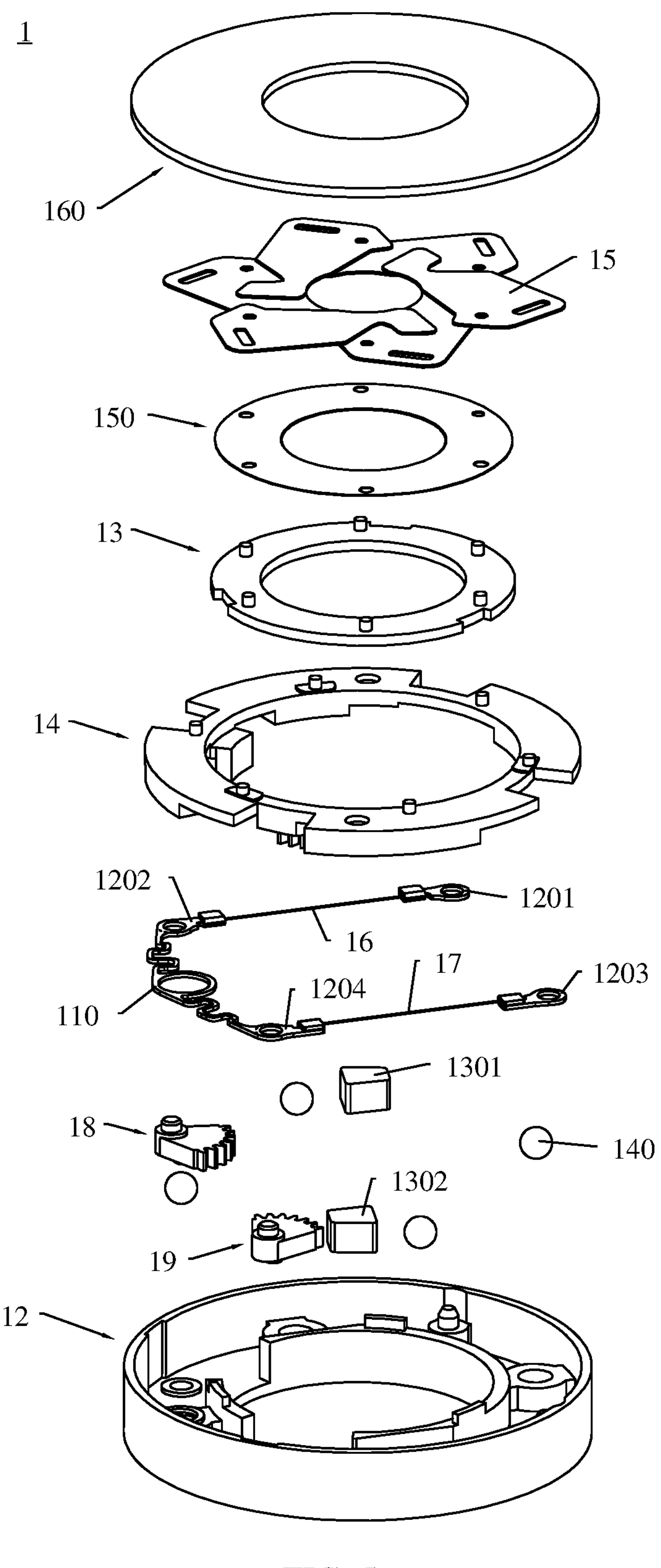
FIG. 5 is a schematic diagram of a partially exploded structure of a variable aperture shown in FIG. 3.

Refer to FIG. 5. FIG. 5 is a schematic diagram of a partially exploded structure of the variable aperture 1 shown in FIG. 3.

In some embodiments, the variable aperture 1 may include a base 12, a fixed plate 13, a rotation plate 14, a plurality of blades 15, a first SMA (shape memory alloys, shape memory alloys) wire 16, a second SMA wire 17, a first flipping block 18, a second flipping block 19, a reset spring 110, a first claw 1201, a second claw 1202, a third claw 1203, a fourth claw 1204, a first magnetic member 1301, a second magnetic member 1302, a plurality of roll balls 140, a light-shielding plate 150, and a cover plate 160. In some other embodiments, the variable aperture 1 may include more or fewer components, or some components may be combined or split.

As shown in FIG. 3 and FIG. 5, for example, the cover plate 160 is fastened to one side of the base 12, and another structure of the variable aperture 1 is installed between the base 12 and the cover plate 160. The cover plate 160 and the base 12 may form an appearance member of the variable aperture 1, and are configured to perform fastening and protection functions. It should be noted that in this embodiment, the variable aperture 1 is described by using an example in which one side the cover plate 160 is on is a "top" and the other side is a "bottom".

As shown in FIG. 5, in this embodiment, there are six blades 15. Each of the blades 15 has a same shape and size. Therefore, each of the blades 15 may use a same number. For brevity of the accompanying drawings, only one of the blades 15 is numbered in FIG. 5. In other embodiments, the number of blades 15 is not limited. Shapes and sizes of the plurality of blades 15 may alternatively be different, and specific shapes and sizes may be flexibly set based on a requirement. In this embodiment, a numbering manner of the plurality of roll balls 140 is the same as a numbering manner of the plurality of blades 15, and details are not described herein again. It should be understood that when there are a plurality of components/structures/constituents in the following descriptions, for the parts/structures/constituents, refer to the numbering manner of the plurality of blades 15. Details are not described below again.

Figure 6:
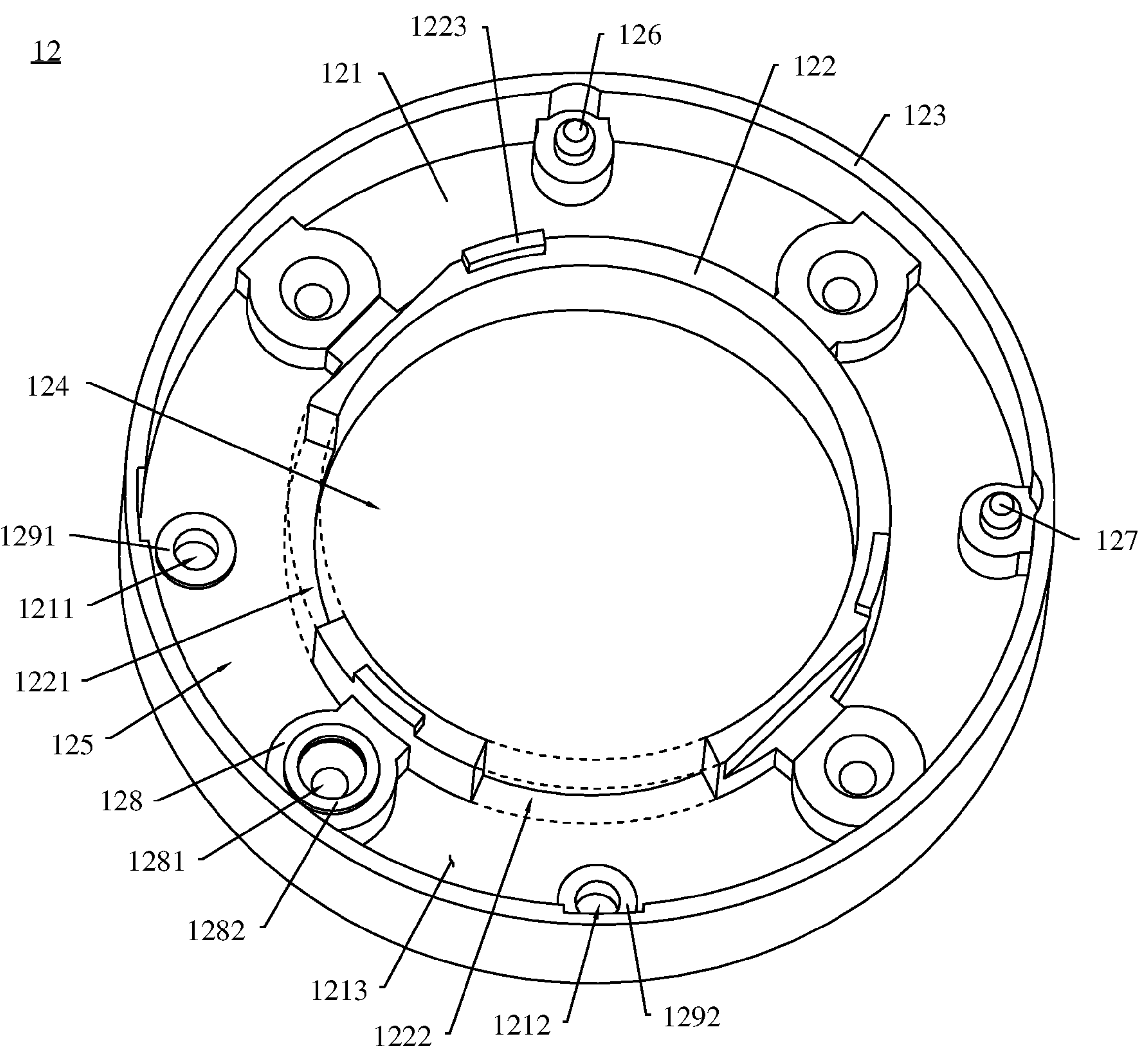
FIG. 6 is a schematic diagram of a structure of a base shown in FIG. 5.

Refer to FIG. 6. FIG. 6 is a schematic diagram of a structure of the base 12 shown in FIG. 5.

In some embodiments, the base 12 includes a bottom plate 121, an inner ring wall 122, and an outer ring wall 123, and the base 12 is provided with a through hole 124. The bottom plate 121 is annular, for example, in a circular ring shape, and the bottom plate 121 is disposed around the through hole 124. The bottom plate 121 includes an inner circumferential edge and an outer circumferential edge that are disposed back to each other, and the outer circumferential edge of the bottom plate 121 is disposed around the inner circumferential edge of the bottom plate 121. The inner ring wall 122 is fastened to the inner circumferential edge of the bottom plate 121, and the inner ring wall 122 is disposed around the through hole 124. The outer ring wall 123 is fastened to the outer circumferential edge of the bottom plate 121, and the outer ring wall 123 surrounds the inner ring wall 122. The outer ring wall 123 is disposed opposite to the inner ring wall 122, and an accommodation space 125 is formed between the outer ring wall 123 and the inner ring wall 122.

The bottom plate 121 may be provided with a first through hole 1211 and a second through hole 1212 that are spaced, and both the first through hole 1211 and the second through hole 1212 communicate with the accommodation space 125. The bottom plate 121 is provided with a top surface 1213 that faces the accommodation space 125. The base 12 may further include a first fixed part 126, a second fixed part 127, and a plurality of connection parts 128, where the first fixed part 126, the second fixed part 127, and the plurality of connection parts 128 are convexly disposed on the top surface 1213 of the bottom plate 121. Both the first fixed part 126 and the second fixed part 127 may include a base table and a fixed column, the base table is fastened to the top surface 1213 of the bottom plate 121, and the fixed column is fastened to a top surface of the base table. The plurality of connection parts 128 are arranged around the first through hole 1211, each of the connection parts 128 is provided with a groove 1281, an opening of the groove 1281 is located on a top surface of the connection part 128, and the groove 1281 may be a hemisphere space, a bowl space, or a space of another shape. The base 12 may further include a first annular boss 1291 and a second annular boss 1292 that are convexly disposed on the top surface 1213 of the bottom plate 121. The first annular boss 1291 is disposed around the first through hole 1211, and the second annular boss 1292 is disposed around the second through hole 1212. The connection part 128 that is in the plurality of connection parts 128 and that is located between the first through hole 1211 and the second through hole 1212 is further provided with a positioning ring 1282. The positioning ring 1282 is located on a top of the connection part 128, and the positioning ring 1282 may be disposed around the groove 1281.

The inner ring wall 122 may be provided with a first notch 1221 and a second notch 1222 that is spaced from the first notch 1221. Both the first notch 1221 and the second notch 1222 communicate with the accommodation space 125. The inner ring wall 122 may further include a plurality of positioning blocks 1223 that are convexly disposed on a top surface of the inner ring wall 122. The plurality of positioning blocks 1223 are arranged around the through hole 124 and are spaced from each other.

The base 12 may be an integrally molded structural member. In some other embodiments, the base 12 may alternatively be an integrated structure formed by assembling a plurality of structural members. This is not strictly limited in this embodiment of this application.

Figure 7:
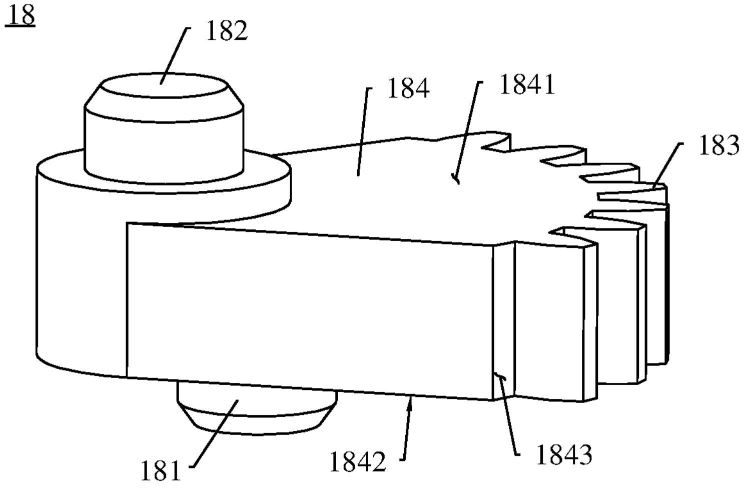
FIG. 7 is a schematic diagram of a structure of a first flipping block shown in FIG. 5.

Refer to FIG. 7. FIG. 7 is a schematic diagram of a structure of the first flipping block 18 shown in FIG. 5.

In some embodiments, the first flipping block 18 includes a rotation part 181, a first connection part 182, and a second connection part 183. For example, the first flipping block 18 may further include a flipping block body 184, and the flipping block body 184 includes a top surface 1841 and a bottom surface 1842 that are disposed back to each other. The rotation part 181 is convexly disposed on the bottom surface 1842 of the flipping block body 184, and the rotation part 181 may include a rotation column. The first connection part 182 is convexly disposed on the top surface 1841 of the flipping block body 184, and the first connection part 182 may include a support table and a connection column convexly disposed on a top surface of the support table. The second connection part 183 may be formed on a side surface 1843 of the flipping block body 184, and the side surface 1843 of the flipping block body 184 is located between the top surface 1841 of the flipping block body 184 and the bottom surface 1842 of the flipping block body 184. For example, the second connection part 183 may be a gear structure.

For example, a spacing between the first connection part 182 and the rotation part 181 is less than a spacing between the second connection part 183 and the rotation part 181. The first connection part 182 and the second connection part 183 may be separately located on two sides of the rotation part 181. The spacing between the first connection part 182 and the rotation part 181 means a spacing between a center of the first connection part 182 and a rotation center of the rotation part 181 on a vertical plane of a rotation center line of the rotation part 181. The spacing between the second connection part 183 and the rotation part 181 means a spacing between a center of the second connection part 183 and the rotation center of the rotation part 181 on the vertical plane of the rotation center line of the rotation part 181.

For example, the flipping block body 184 may be approximately in a sector shape, the first connection part 182 may be fastened to a circle center of the flipping block body 184 or disposed near the circle center. The second connection part 183 may be fastened to an outer cambered surface (namely, a side surface 1843) of the flipping block body 184, and the rotation part 181 is fastened between the circle center and the outer cambered surface of the flipping block body 184.

The second flipping block 19 may be a same structure as the first flipping block 18, to simplify a material type and reduce design difficulty and costs. A structure of the second flipping block 19 is not described in detail in this embodiment of this application.

Figure 8:
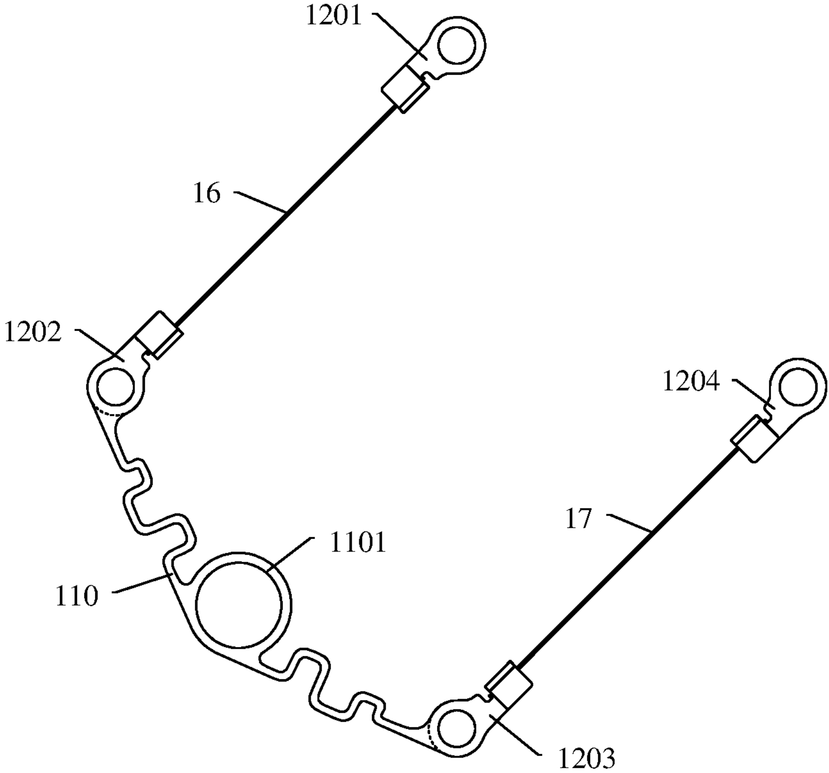
FIG. 8 is a schematic diagram of a partial structure of the variable aperture shown in FIG. 5.

Refer to FIG. 8. FIG. 8 is a schematic diagram of a partial structure of the variable aperture 1 shown in FIG. 5.

In some embodiments, two ends of the first SMA wire 16 are separately connected to the first claw 1201 and the second claw 1202, and two ends of the second SMA wire 17 are separately connected to the third claw 1203 and the fourth claw 1204. Two ends of the reset spring 110 are separately connected to the second claw 1202 and the fourth claw 1204. The reset spring 110, the second claw 1202, and the fourth claw 1204 may be an integrally molded structure.

A middle part of the reset spring 110 may form a ring 1101, and a bent connection section may be formed between the middle part and an end part of the reset spring 110.

Figure 9:
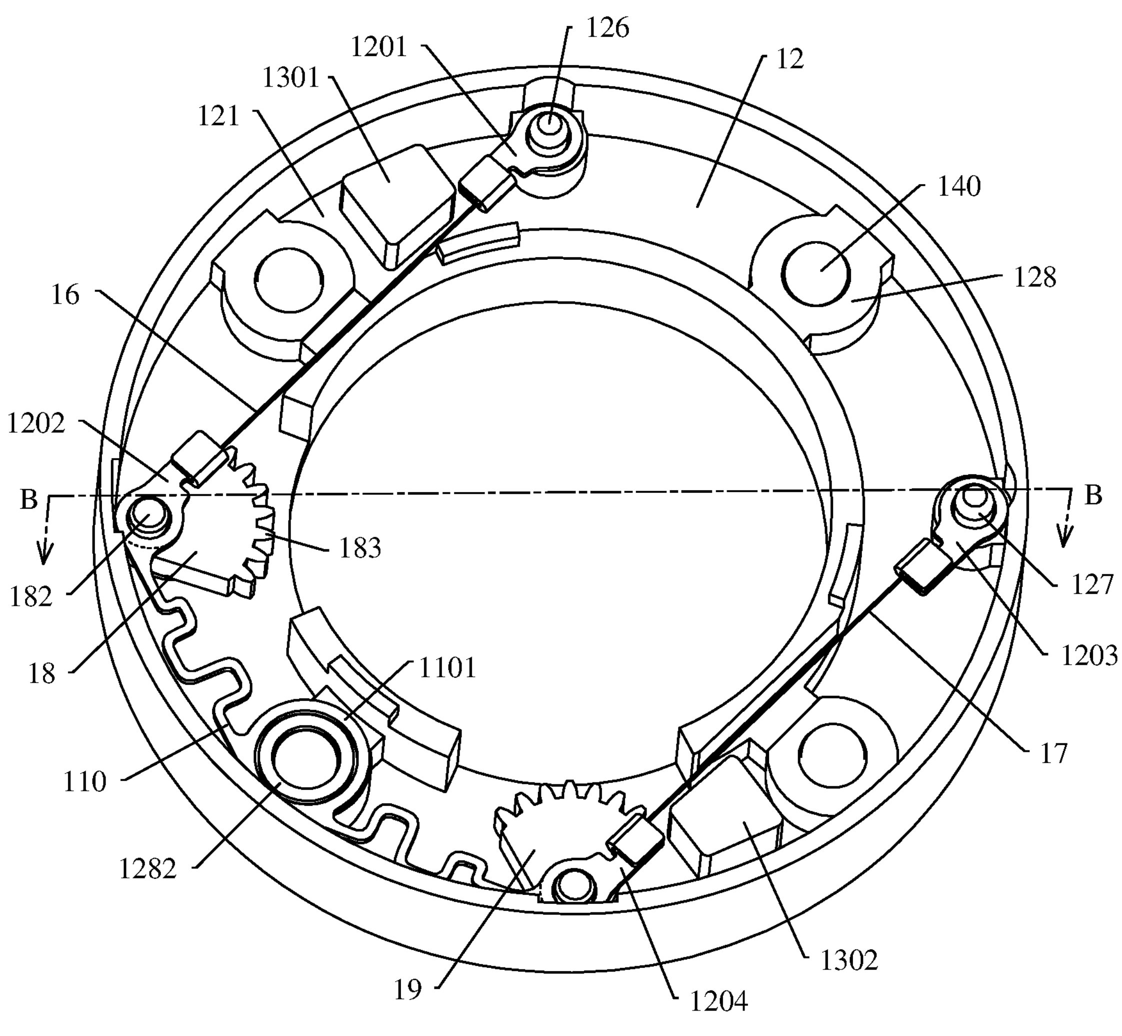
FIG. 9 is a first schematic diagram of a partial structure of a variable aperture shown in FIG. 3.
Figure 10:
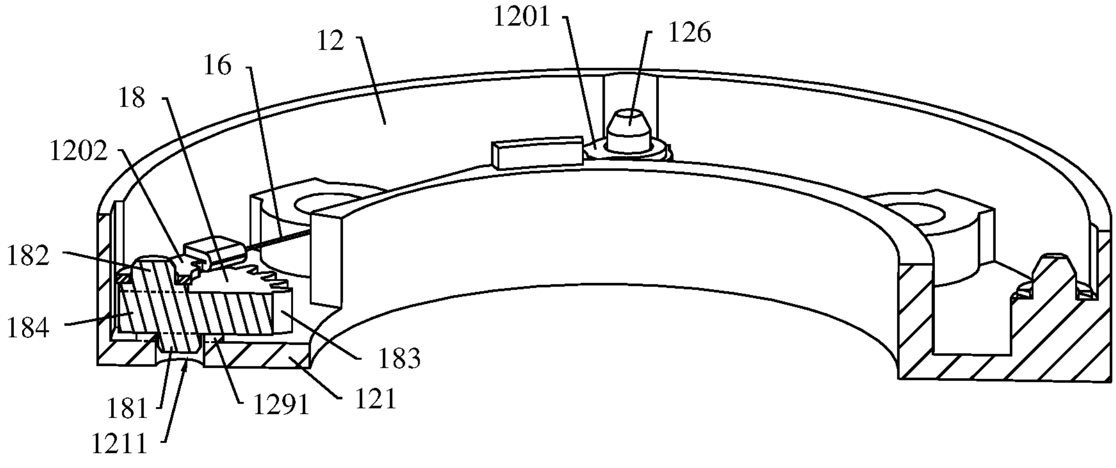
FIG. 10 is a schematic diagram of the structure shown in FIG. 9 that is cut in a B-B position.

Refer to FIG. 9 and FIG. 10. FIG. 9 is a first schematic diagram of a partial structure of the variable aperture 1 shown in FIG. 3, and FIG. 10 is a schematic diagram of the structure shown in FIG. 9 that is cut in a B-B position.

In some embodiments, the first flipping block 18 is installed on the base 12 and is rotatively connected to the base 12. The rotation part 181 of the first flipping block 18 may be installed in the first through hole 1211 of the bottom plate 121 of the base 12, to be rotatively connected to the base 12. The flipping block body 184 of the first flipping block 18 abuts against the first annular boss 1291, so that a contact area between the first flipping block 18 and the base 12 is small. This helps reduce a friction force generated when the first flipping block 18 rotates relative to the base 12.

As shown in FIG. 10, because the rotation part 181 of the first flipping block 18 is located between the first connection part 182 and the second connection part 183, when one of the first connection part 182 and the second connection part 183 rotates about the rotation part 181 under force, the other also rotates about the rotation part 181.

Similarly, the second flipping block 19 is installed on the base 12 and is rotatively connected to the base 12. For a connection structure between the second flipping block 19 and the base 12, refer to a connection structure between the first flipping block 18 and the base 12. Details are not described herein again.

As shown in FIG. 9 and FIG. 10, the first claw 1201 is installed on the first fixed part 126 of the base 12, so that one end of the first SMA wire 16 is connected to the base 12. The second claw 1202 is connected to the first connection part 182 of the first flipping block 18, so that the other end of the first SMA wire 16 is connected to the first connection part 182.

As shown in FIG. 9, the ring 1101 in the middle part of the reset spring 110 may be sleeved on an outer side of the positioning ring 1282, so that the reset spring 110 is connected to the base 12. Because one end of the reset spring 110 is connected to the first claw 1201, and the first claw 1201 is connected to the first connection part 182, the reset spring 110 is connected to the first connection part 182 and the base 12. Refer to FIG. 9 and FIG. 10. The first SMA wire 16 may shrink when power is on, to drive the first connection part 182 to rotate clockwise about the rotation part 181, so that the second connection part 183 rotates clockwise about the rotation part 181, the first flipping block 18 rotates clockwise relative to the base 12, and the reset spring 110 is stretched. When the first SMA is powered off, an elastic force of the reset spring 110 enables the first flipping block 18 to rotate anticlockwise relative to the base 12 to implement reset, and the first SMA wire 16 is stretched.

As shown in FIG. 9, the third claw 1203 is installed on the second fixed part 127 of the base 12, so that one end of the second SMA wire 17 is connected to the base 12. The fourth claw 1204 is connected to the second flipping block 19, so that the other end of the second SMA wire 17 is connected to the second flipping block 19. The reset spring 110 is connected to the fourth claw 1204 and the base 12. For actions of the second SMA wire 17 and the second flipping block 19, refer to related descriptions of the first SMA wire 16 and the first flipping block 18.

It may be understood that in this embodiment, two ends of the reset spring 110 are separately connected to the first flipping block 18 and the second flipping block 19, and the middle part is connected to the base 12. In some other embodiments, the reset spring 110 may alternatively include two parts independent of each other. One part is connected to the first flipping block 18 and the base 12, and the other part is connected to the second flipping block 19 and the base 12. A specific structure of the reset spring 110, a connection structure between the reset spring 110 and the base 12, and a connection structure between the reset spring 110 and both of the first flipping block 18 and the second flipping block 19 are not strictly limited in this application.

In some embodiments, as shown in FIG. 9, the first magnetic member 1301 is fastened to the base 12 and is disposed corresponding to the first SMA wire 16, and may, for example, be fastened to the bottom plate 121 and arranged close to the first SMA wire 16. The second magnetic member 1302 is fastened to the base 12 and is disposed corresponding to the second SMA wire 17, and may, for example, be fastened to the bottom plate 121 and arranged close to the second SMA wire 17.

The first magnetic member 1301 and the second magnetic member 1302 may be permanent magnets, so that the first magnetic member 1301 attracts the first SMA wire 16, and the second magnetic member 1302 attracts the second SMA wire 17, to avoid that the SMA wires flutter in a loosened state. Alternatively, the first magnetic member 1301 and the second magnetic member 1302 may be electromagnets, and are configured to: under control of an electrical signal, attract the first SMA wire 16 and/or the second SMA wire 17 in some time periods, and not attract the first SMA wire 16 and/or the second SMA wire 17 in other time periods.

As shown in FIG. 6 and FIG. 9, the plurality of roll balls 140 are separately installed in the grooves 1281 of the plurality of connection parts 128 of the base 12.

Figure 11:
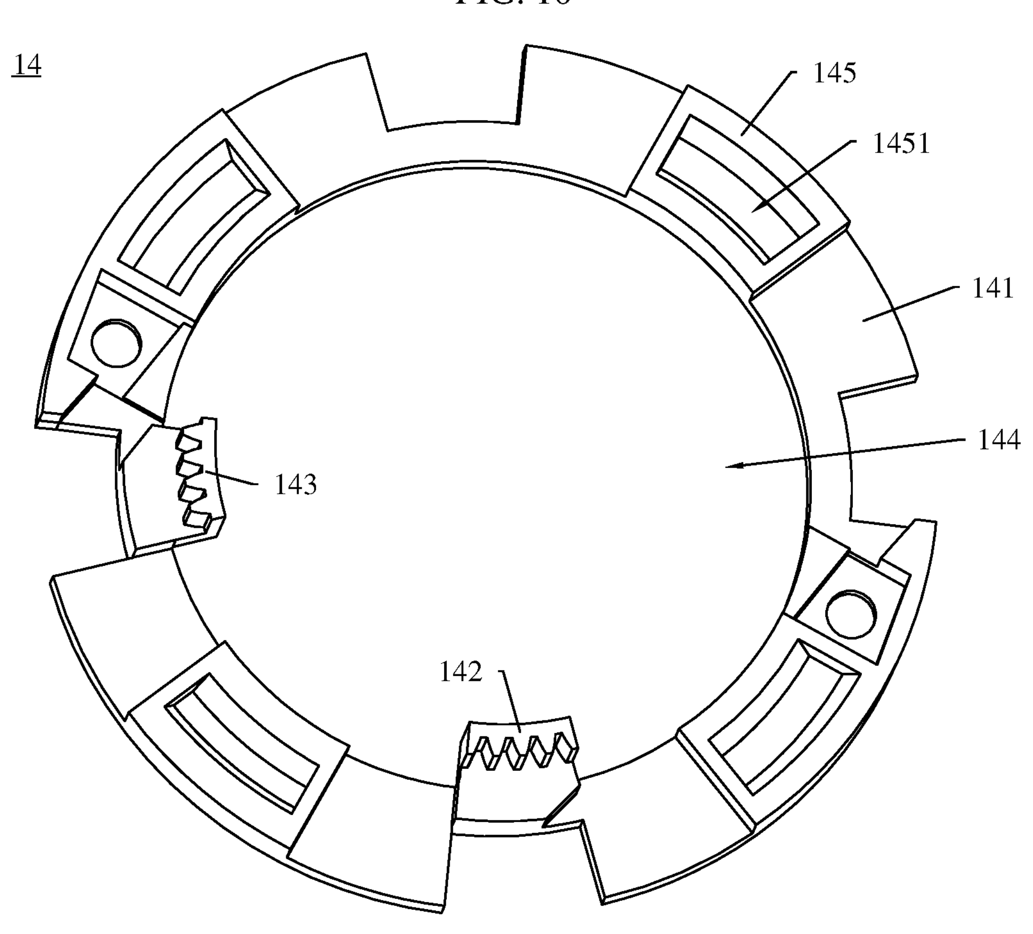
FIG. 11 is a schematic diagram of a structure of a rotation plate shown in FIG. 5.

Refer to FIG. 11. FIG. 11 is a schematic diagram of the rotation plate 14 shown in FIG. 5.

In some embodiments, the rotation plate 14 includes a plate body 141, and a first fitting part 142 and a second fitting part 143 that are fastened to one side of the plate body 141. The plate body 141 is in a ring shape and is provided with an inner through hole 144. The first fitting part 142 and the second fitting part 143 are spaced. The first fitting part 142 may form a gear structure, and the second fitting part 143 may form a gear structure.

The rotation plate 14 may further include a plurality of guide parts 145 fastened to one side of the plate body 141, and the plurality of guide parts 145 and the first fitting part 142 are located on a same side of the plate body 141. Each of the guide parts 145 includes a guide groove 1451. An extension track of the guide groove 1451 may be an arc, and circle centers of the extension tracks of the guide grooves 1451 of the plurality of guide parts 145 coincide. A cross-sectional shape of the guide groove 1451 may be an arc, a bowl, a trapezoid, a U, or the like.

Figure 12:
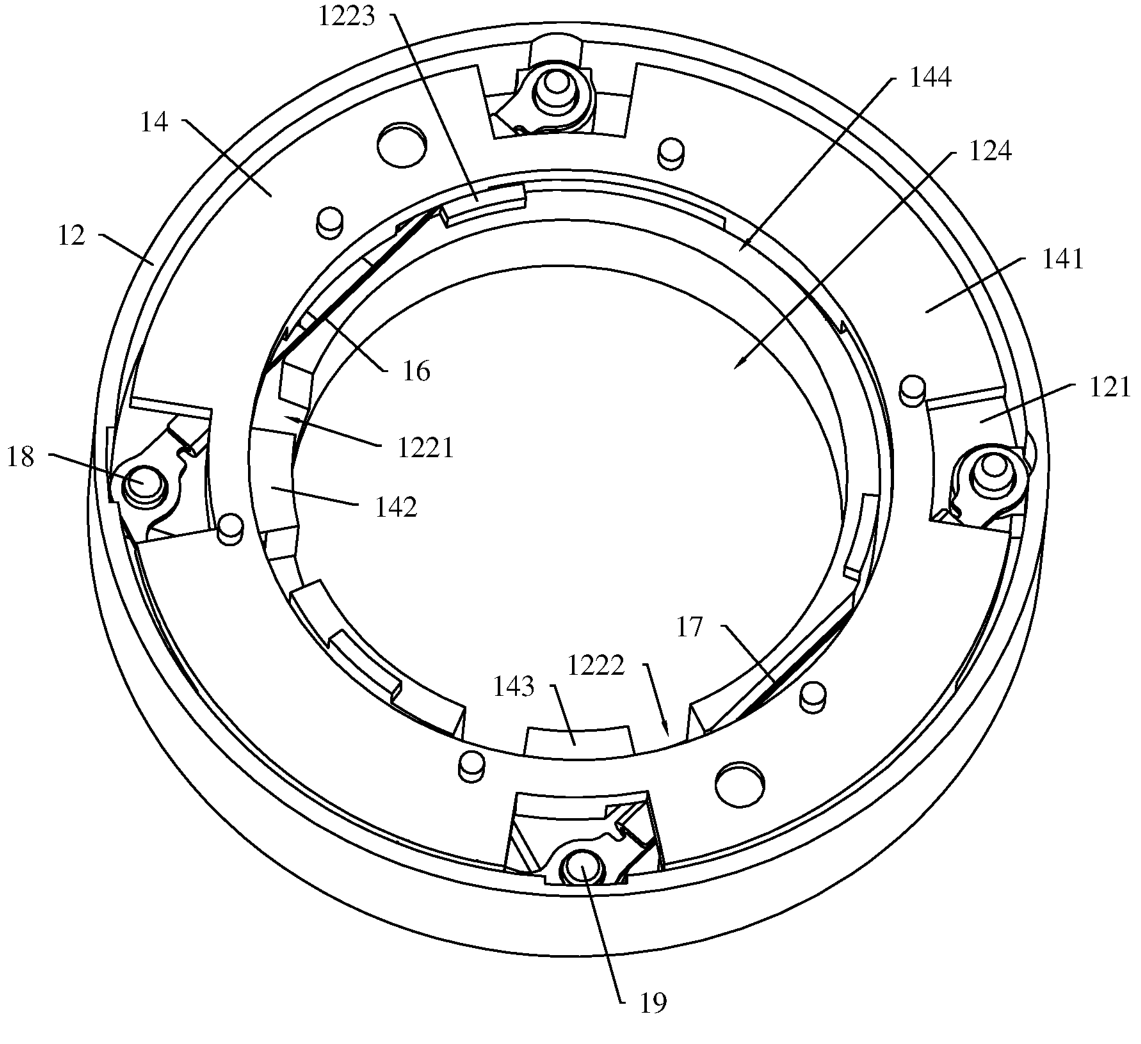
FIG. 12 is a second schematic diagram of a partial structure of the variable aperture shown in FIG. 3.

Refer to FIG. 9, FIG. 11, and FIG. 12. FIG. 12 is a second schematic diagram of a partial structure of the variable aperture 1 shown in FIG. 3.

In some embodiments, the rotation plate 14 is installed on the base 12 and is rotatively connected to the base 12. The inner through hole 144 of the rotation plate 14 is disposed opposite to the through hole 124 of the base 12. The plate body 141 of the rotation plate 14 is disposed opposite to the bottom plate 121 of the base 12, the plurality of roll balls 140 are in a one-to-one correspondence with the plurality of guide parts 145, and each of the roll ball 140 is partially located in the guide groove 1451 of a corresponding guide part 145. In this case, the rotation plate 14 is connected to the base 12 through a roll ball slide rail, so that the rotation plate 14 can rotate relative to the base 12. In some other embodiments, the roll ball slide rail may alternatively be a structure different from the structure in the foregoing embodiment. This is not strictly limited in this application. In some other embodiments, the rotation plate 14 and the base 12 may alternatively be rotatively connected through another structure. This is not strictly limited in this application.

Figure 13:
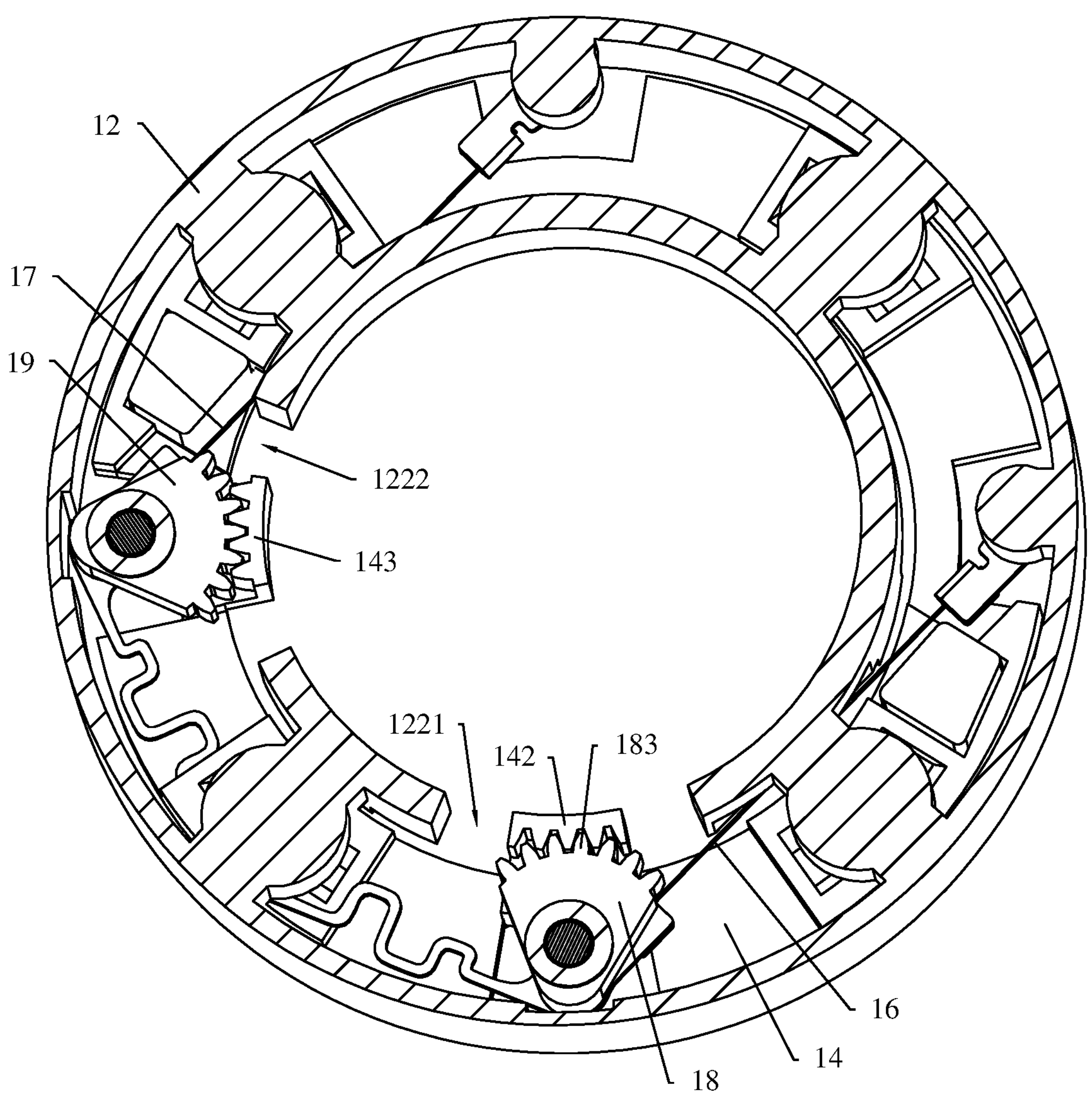
FIG. 13 is a schematic diagram of an internal structure of the structure shown in FIG. 12.

Refer to FIG. 12 and FIG. 13. FIG. 13 is a schematic diagram of an internal structure of the structure shown in FIG. 12. A perspective of FIG. 13 is upside down to a perspective of FIG. 12.

In some embodiments, the first fitting part 142 of the rotation plate 14 is located in the first notch 1221 of the base 12, and the first fitting part 142 fits with the second connection part 183 of the first flipping block 18, so that the rotation plate 14 is rotatively connected to the second connection part 183. For example, the gear structure of the second connection part 183 is engaged with the gear structure of the first fitting part 142 of the rotation plate 14, that is, the second connection part 183 is engaged with the rotation plate 14, so that the first flipping block 18 is linked to the rotation plate 14. In some other embodiments, the second connection part 183 may be linked to the rotation plate 14 through interference fit. The second fitting part 143 of the rotation plate 14 is located in the second notch 1222 of the base 12, the second fitting part 143 fits with the second flipping block 19, and the second fitting part 143 is linked to the second flipping block 19.

In this embodiment, the first flipping block 18 is linked to the rotation plate 14, the first SMA wire 16 is connected to the rotation plate 14 through the first flipping block 18, the second flipping block 19 is linked to the rotation plate 14, and the second SMA wire 17 is connected to the rotation plate 14 through the second flipping block 19. Therefore, one end of each of the first SMA wire 16 and the second SMA wire 17 is connected to the base 12, and the other end is connected to the rotation plate 14. For example, the first SMA wire 16 shrinks to drive the first rotation block to rotate, the first flipping block 18 flips the rotation plate 14 to rotate relative to the base 12, the second flipping block 19 is driven by the rotation plate 14 to rotate, and the second SMA wire 17 is stretched. Similarly, the second SMA wire 17 shrinks to drive the rotation plate 14 to rotate in another direction, and the first SMA wire 16 is stretched.

In addition, the first fitting part 142 and the second fitting part 143 of the rotation plate 14 are arranged by using the notches (1221, 1222) of the base 12, to share space with the base 12. This improves space utilization of the variable aperture 1, and facilitates miniaturization of the variable aperture 1.

Figure 14:
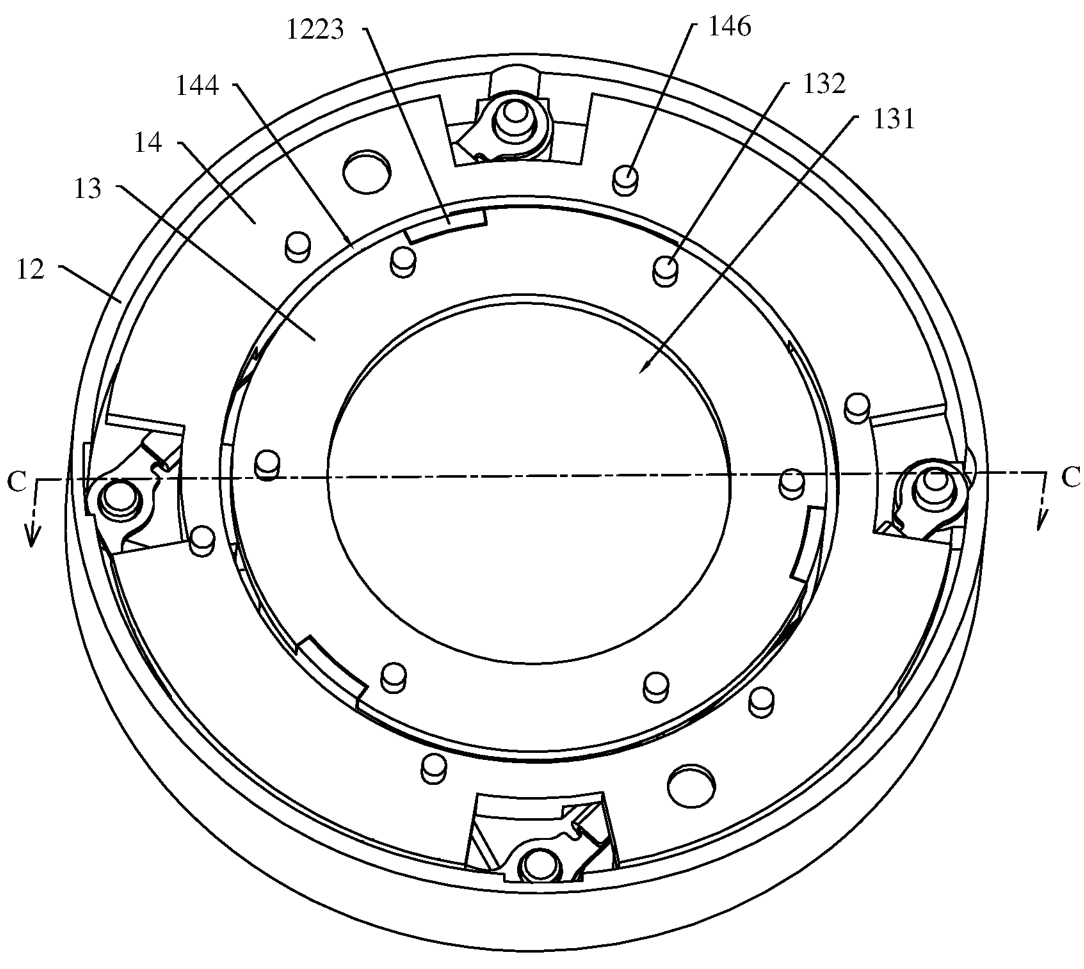
FIG. 14 is a third schematic diagram of a partial structure of the variable aperture shown in FIG. 3.
Figure 15:
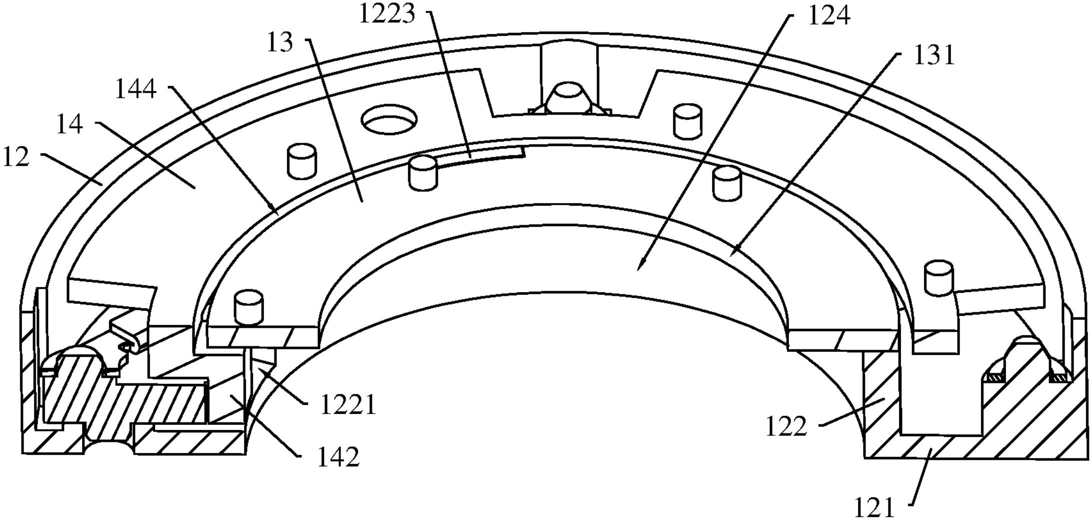
FIG. 15 is a schematic diagram of a cross-sectional structure of the structure shown in FIG. 14 that is cut in a C-C position.

Refer to FIG. 12, FIG. 14, and FIG. 15. FIG. 14 is a third schematic diagram of a partial structure of the variable aperture 1 shown in FIG. 3, and FIG. 15 is a schematic diagram of a cross-sectional structure of the structure shown in FIG. 14 that is cut in a C-C position.

In some embodiments, the fixed plate 13 is installed on the base 12 and is fixedly connected to the base 12. The fixed plate 13 may be located in the inner through hole 144 of the rotation plate 14, that is, the rotation plate 14 is disposed around the fixed plate 13. The fixed plate 13 is in a ring shape, an inner through hole 131 of the fixed plate 13 is disposed opposite to the through hole 124 of the base 12, and light enters the through hole 124 of the base 12 through the inner through hole 131 of the fixed plate 13. For example, the inner through hole 131 of the fixed plate 13 and the through hole 124 of the base 12 may be coaxially disposed. The plurality of positioning blocks 1223 of the base 12 may be embedded in the fixed plate 13, to limit the fixed plate 13 in a circumferential direction of the through hole 124.

The fixed plate 13 is fastened to a side that is of the inner ring wall 122 of the base 12 and that backs onto the bottom plate 121. The fixed plate 13 covers the first notch 1221 and the second notch 1222, so that the first fitting part 142 and the second fitting part 143 of the rotation plate 14 are limited between the fixed plate 13 and the bottom plate 121 of the base 12, and the rotation plate 14 can stably rotate between the fixed plate 13 and the base 12.

In some embodiments, as shown in FIG. 14, the fixed plate 13 includes a plurality of first fixed columns 132, and the plurality of first fixed columns 132 are annularly arranged at equal spacing. The rotation plate 14 includes a plurality of second fixed columns 146, and the plurality of second fixed columns 146 are annularly arranged at equal spacing. A quantity of the second fixed columns 146 is the same as a quantity of the first fixed columns 132, and the plurality of second fixed columns 146 are in a one-to-one correspondence with the plurality of first fixed columns 132.

Figure 16:
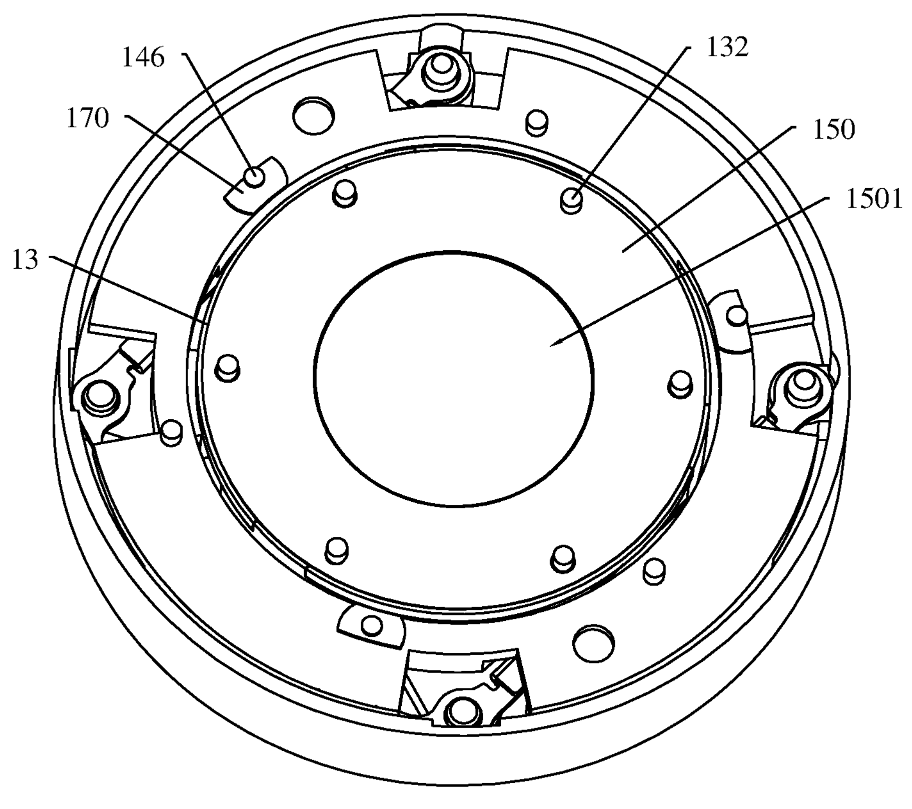
FIG. 16 is a fourth schematic diagram of a partial structure of the variable aperture shown in FIG. 3.

Refer to FIG. 14 and FIG. 16. FIG. 16 is a fourth schematic diagram of a partial structure of the variable aperture 1 shown in FIG. 3.

In some embodiments, the light-shielding plate 150 is fastened to the fixed plate 13, and the light-shielding plate 150 is located on a side that is of the fixed plate 13 and that backs onto the inner ring wall 122 of the base 12. The light-shielding plate 150 is in a ring shape, an inner through hole 1501 of the light-shielding plate 150 is disposed opposite to the inner through hole 131 of the fixed plate 13, and an aperture of the inner through hole 1501 of the light-shielding plate 150 is smaller than an aperture of the inner through hole 131 of the fixed plate 13. The plurality of first fixed columns 132 of the fixed plate 13 pass through the light-shielding plate 150, and protrude relative to a top surface of the light-shielding plate 150.

In some embodiments, the variable aperture 1 may further include a plurality of gaskets 170, a quantity of the gaskets 170 is less than the quantity of the second fixed columns 146, and the plurality of gaskets 170 are sleeved on some second fixed columns 146.

Figure 17:
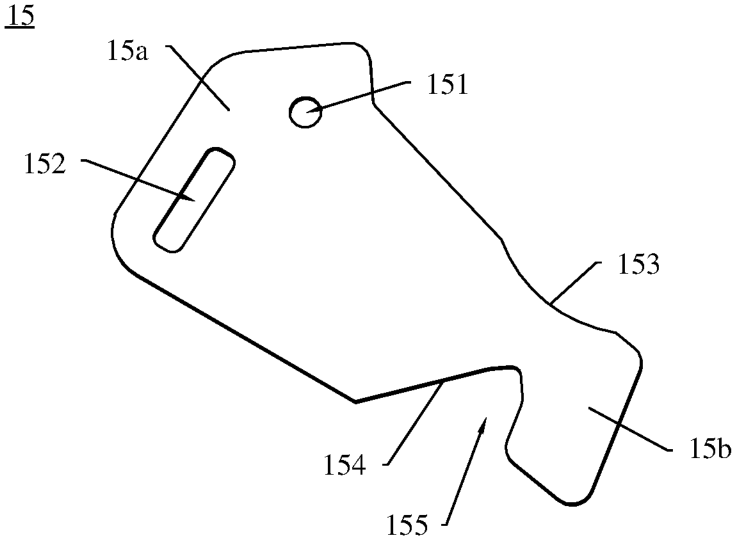
FIG. 17 is a schematic diagram of a structure of a blade shown in FIG. 5.

Refer to FIG. 5 and FIG. 17. FIG. 17 is a schematic diagram of a structure of the blade 15 shown in FIG. 5.

In some embodiments, a quantity of the blades 15 of the variable aperture 1 may be five to ten, for example, six in this embodiment. Each of the blades 15 includes a first end part 15*a* and a second end part 15*b*, and the second end part 15*b* is disposed back to the first end part 15*a*. The first end part 15*a* includes a rotation hole 151 and a guide hole 152 that are spaced. The rotation hole 151 is a circular hole. The guide hole 152 is a strip hole, and an extension track may be a straight line, an arc line, or another curve. The second end part 15*b* includes a first edge 153, and the first edge 153 and the guide hole 152 are disposed on a same side. A shape of the first edge 153 may be a straight line, an arc line, a combination of a straight line and an arc line, a combination of a straight line and a straight line, or a combination of an arc line and an arc line. The second end part 15*b* may further include a second edge 154, the second edge 154 is disposed back to the first edge 153, and the second edge 154 and the guide hole 152 are disposed on a same side. The second edge 154 may be concave to form an avoidance notch 155.

Figure 18:
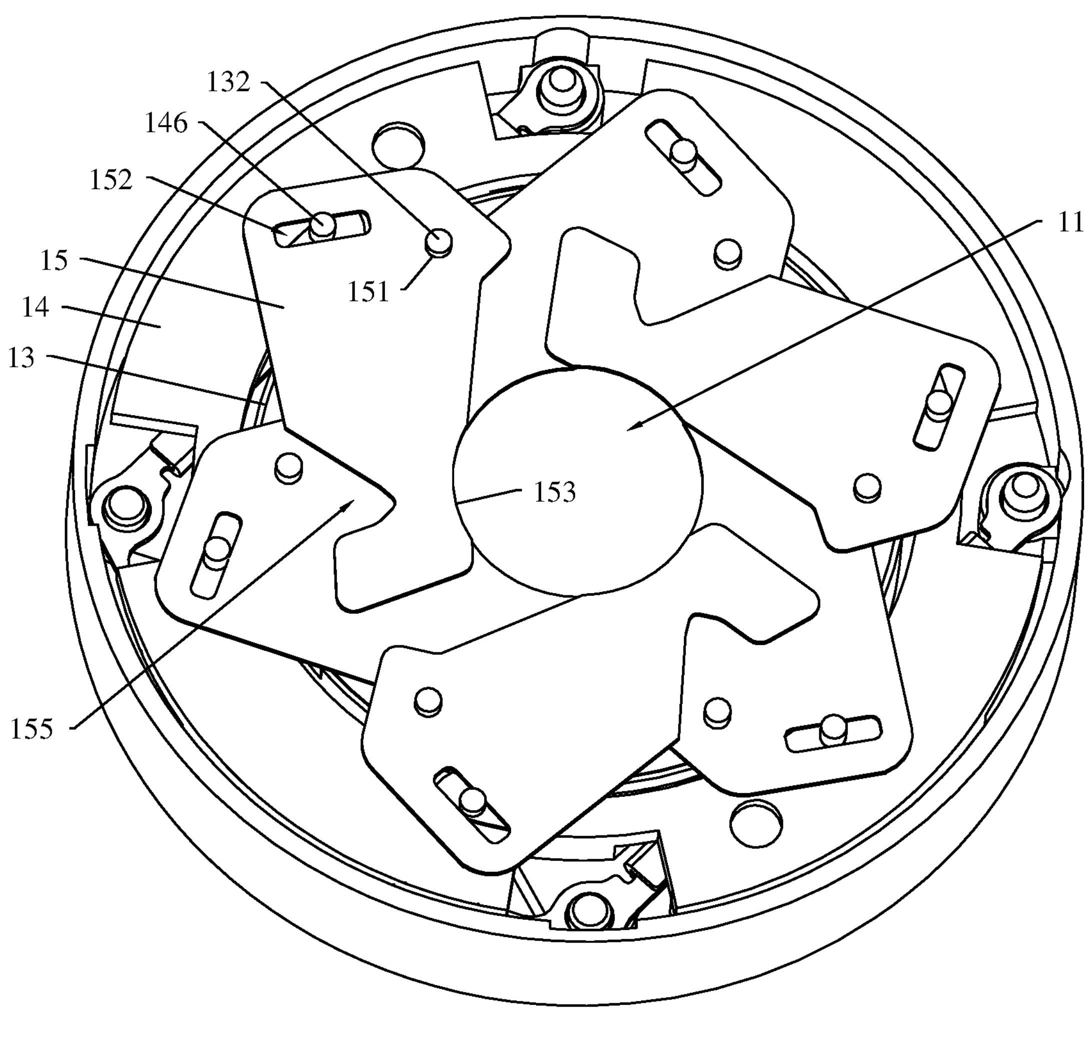
FIG. 18 is a fifth schematic diagram of a partial structure of the variable aperture shown in FIG. 3.

Refer to FIG. 18. FIG. 18 is a fifth schematic diagram of a partial structure of the variable aperture 1 shown in FIG. 3.

In some embodiments, the plurality of blades 15 are located on a same side of the fixed plate 13 and the rotation plate 14. The plurality of blades 15 are annularly distributed and enclose the aperture hole 11. The aperture hole 11 is disposed opposite to the through hole 124. The first edge 153 of each of the blades 15 is a part of a hole wall of the aperture hole 11. For example, when the first edge 153 is an arc-line edge, the aperture hole 11 may be a circular hole. In some other embodiments, when the first edge 153 is a straight-line edge, the aperture hole 11 may be a polygonal hole.

Each of the blades 15 is rotatively connected to the fixed plate 13, and is slidably connected to the rotation plate 14. The first fixed column 132 of the fixed plate 13 is inserted into the rotation hole 151 of the blade 15, so that the blade 15 can rotate relative to the fixed plate 13. The second fixed column 146 of the rotation plate 14 is inserted into the guide hole 152 of the blade 15, and can slide in the guide hole 152, so that the blade 15 can slide relative to the rotation plate 14. One blade 15 is connected to the corresponding first fixed column 132 and the corresponding second fixed column 146. When the rotation plate 14 rotates relative to the fixed plate 13, the second fixed column 146 slides in the guide hole 152, the second fixed column 146 drives the blade 15 to rotate about the first fixed column 132 relative to the fixed plate 13, and the plurality of blades 15 are closed to narrow the aperture hole 11 or opened to enlarge the aperture hole 11.

The plurality of blades 15 may be stacked into two layers. The blades 15 stacked at a bottom layer may be in contact with the rotation plate 14 and the fixed plate 13. The blades 15 stacked at a top layer may be in contact with the gaskets 170 (as shown in FIG. 16) and the blades 15 stacked at the bottom layer, and are heightened by the gaskets 170 and the blades 15 stacked at the bottom layer.

The avoidance notch 155 of the blade 15 is configured to avoid the first fixed column 132 that is of the fixed plate 13 and that is adjacent to the blade 15.

Figure 19:
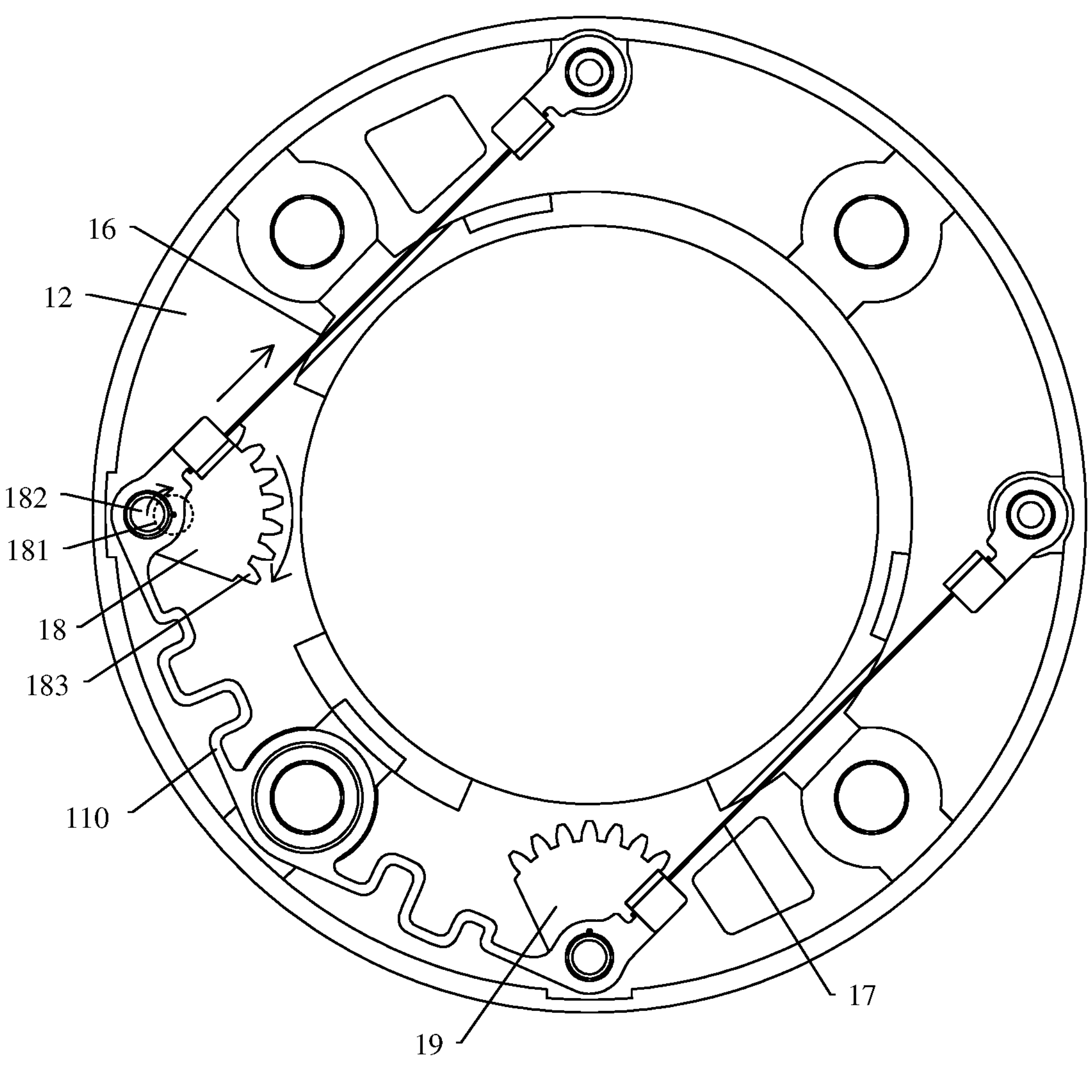
FIG. 19 is a first schematic diagram of a partial structure of the variable aperture shown in FIG. 3 in a use state.
Figure 20:
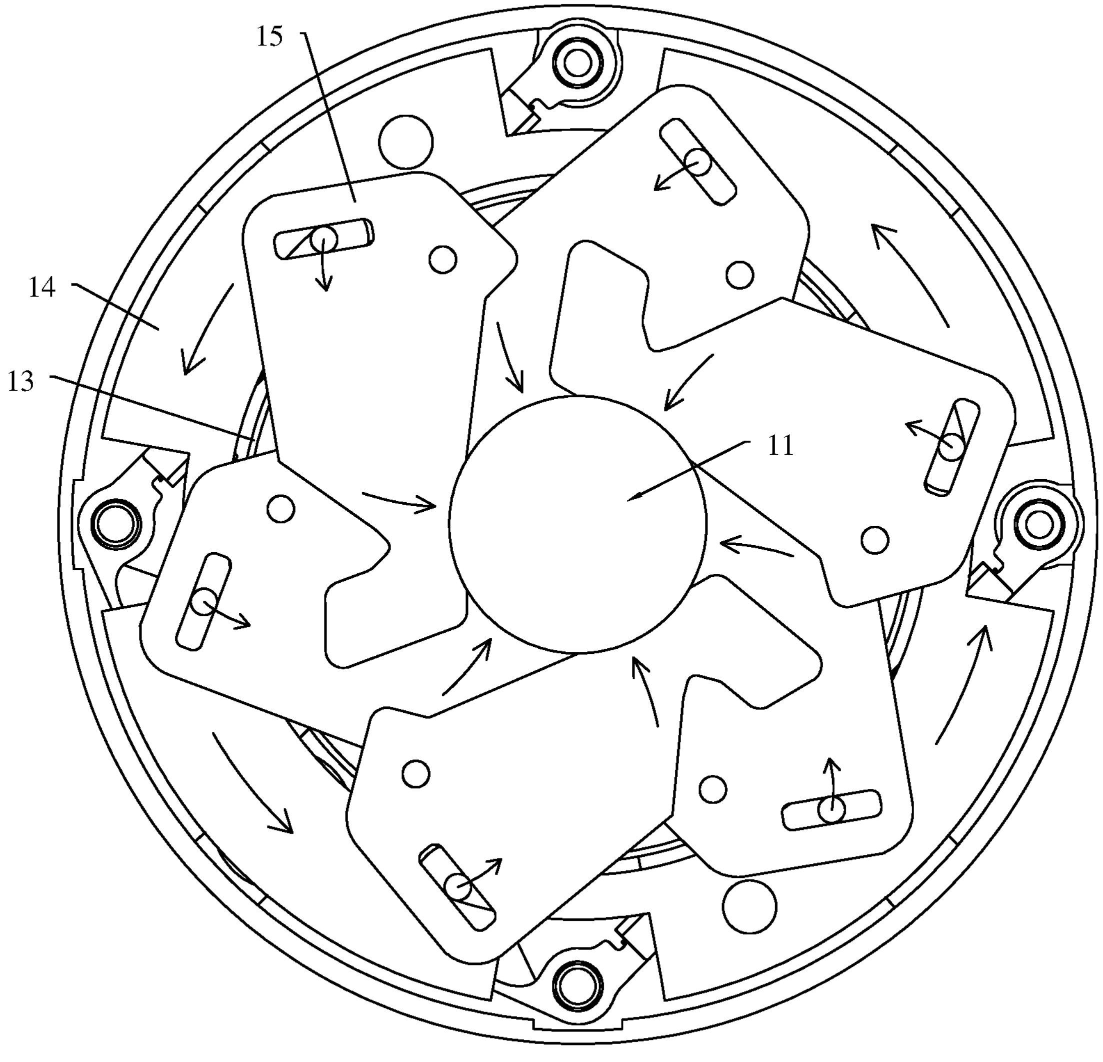
FIG. 20 is a second schematic diagram of a partial structure of the variable aperture shown in FIG. 3 in a use state.

Refer to FIG. 19 and FIG. 20. FIG. 19 is a first schematic diagram of a partial structure of the variable aperture 1 shown in FIG. 3 in a use state, and FIG. 20 is a second schematic diagram of a partial structure of the variable aperture 1 shown in FIG. 3 in a use state. A state in FIG. 20 corresponds to a state in FIG. 19.

In this embodiment, one end of the first SMA wire 16 is connected to the base 12, the other end of the first SMA wire 16 is connected to the rotation plate 14 through the first flipping block 18, one end of the second SMA wire 17 is connected to the base 12, and the other end of the second SMA wire 17 is connected to the rotation plate 14 through the second flipping block 19.

In a use state, the first SMA wire 16 is configured to shrink when power is on, and the first SMA wire 16 shrinks to drive the first connection part 182 of the first flipping block 18 to rotate clockwise about the rotation part 181, so that the second connection part 183 rotates clockwise about the rotation part 181 and flips the rotation plate 14 to rotate anticlockwise relative to the fixed plate 13. That is, the first SMA wire 16 shrinks to drive the rotation plate 14 to rotate anticlockwise. Each of the blades 15 rotates anticlockwise relative to the fixed plate 13 to implement a centripetal motion, and slides relative to the rotation plate 14. The plurality of blades 15 are closed to narrow the aperture of the aperture hole 11. After the first SMA wire 16 is powered off, the reset spring 110 drives the first flipping block 18 to rotate anticlockwise, the first SMA wire 16 is stretched to an initial length, the first flipping block 18 flips the rotation plate 14 to rotate clockwise to an initial position, and the plurality of blades 15 are reset.

It may be understood that in another use state, the second SMA wire 17 is configured to shrink when power is on, the second SMA wire 17 shrinks to drive the second flipping block 19 to rotate anticlockwise, and the second flipping block 19 flips the rotation plate 14 to rotate clockwise relative to the fixed plate 13. That is, the second SMA wire 17 shrinks to drive the rotation plate 14 to rotate clockwise. Each of the blades 15 rotates clockwise relative to the fixed plate 13 to implement a centrifugal motion, and slides relative to the rotation plate 14. The plurality of blades 15 are opened to enlarge the aperture hole 11. After the second SMA wire 17 is powered off, the reset spring 110 drives the second flipping block 19 to rotate clockwise, the second SMA wire 17 is stretched to an initial length, the second flipping block 19 flips the rotation plate 14 to rotate anticlockwise to an initial position, and the plurality of blades 15 are reset.

In short, the first SMA wire 16 or the second SMA wire 17 is configured to shrink when power is on, to drive the rotation plate 14 to rotate relative to the fixed plate 13. Each of the blades 15 rotates relative to the fixed plate 13 and slides relative to the rotation plate 14, so that the aperture of the aperture hole 11 changes. A direction in which the first SMA wire 16 shrinks to drive the rotation plate 14 to rotate is opposite to a direction in which the second SMA wire 17 shrinks to drive the rotation plate 14 to rotate.

In this embodiment, the variable aperture 1 drives, by using the first SMA wire 16 or the second SMA wire 17, the rotation plate 14 to rotate relative to the fixed plate 13, so that the plurality of blades 15 are closed or opened, and the aperture of the aperture hole 11 changes. Compared with a conventional voice coil motor, a driving mechanism of the variable aperture 1 is not prone to being interfered with by electromagnetic waves, so that aperture adjustment precision of the aperture hole 11 of the variable aperture 1 is high, and reliability is high. In this case, the camera module 20 in which the variable aperture 1 is used has high imaging quality.

In addition, because components of the driving mechanism for driving by using the SMA wire are small in size and arranged compactly, compared with the conventional voice coil motor, the variable aperture 1 can narrow space in a length direction and a width direction. This facilitates miniaturization of the variable aperture 1. The length direction and the width direction are perpendicular to each other, and both are perpendicular to a center line of the aperture hole 11.

In addition, because the variable aperture 1 is provided with the reset spring 110, the reset spring 110 can reset the blade 15 after power-off. Therefore, the variable aperture 1 does not need to be additionally powered on, and power consumption can be reduced, so that power consumption of the variable aperture 1 is low.

It may be understood that an aperture hole of a variable aperture of the conventional voice coil motor is likely to change slightly because magnetic forces of a magnet and a coil have upper limits. In other words, a change range of the aperture hole of the conventional variable aperture is limited. However, in this application, the variable aperture 1 is driven by using the first SMA wire 16 or the second SMA wire 17, and an aperture change range of the aperture hole 11 of the variable aperture 1 is not affected by magnetic forces of a magnet and a coil. In addition, because the spacing between the first connection part 182 and the rotation part 181 of the first flipping block 18 is less than the spacing between the second connection part 183 and the rotation part 181, the first flipping block 18 can implement a travel expansion. When a shrinkage length of the first SMA wire 16 is small, the first flipping block 18 can flip the rotation plate 14 to rotate relative to the fixed plate 13 by a large angle, so that a rotation angle of the blade 15 is large, and an aperture change of the aperture hole 11 is large. The second flipping block 19 can also implement a travel expansion, so that the aperture change range of the aperture hole 11 of the variable aperture 1 is large. This helps improve photographing quality and enrich photographing scenarios of the camera module 30 in which the variable aperture 1 is used.

In some other embodiments, a connection structure between the first SMA wire 16 and the rotation plate 14 and a connection structure between the second SMA wire 17 and the rotation plate 14 are changed, so that the first SMA wire 16 shrinks to drive the rotation plate 14 to rotate clockwise, and the second SMA wire 17 shrinks to drive the rotation plate 14 to rotate anticlockwise.

In some other embodiments, the spacing between the first connection part 182 and the rotation part 181 may alternatively be greater than or equal to the spacing between the second connection part 183 and the rotation part 181. In some other embodiments, the first connection part 182 and the second connection part 183 may alternatively be located on a same side of the rotation part 181. This is not strictly limited in this embodiment of this application.

In some other embodiments, if the direction in which the first SMA wire 16 shrinks to drive the rotation plate 14 to rotate is opposite to the direction in which the second SMA wire 17 shrinks to drive the rotation plate 14 to rotate, the first SMA wire 16 and the second SMA wire 17 may alternatively be connected to the rotation plate 14 in another manner, including a direct connection manner and an indirect connection manner. This is not strictly limited in this application.

In some other embodiments, a structure, a position, and a connection relationship of the reset spring 110 may alternatively be different from those in the foregoing embodiments. For example, the reset spring 110 may alternatively be connected to the base 12 and the rotation plate 14, so that the rotation plate 14, after rotating relative to the fixed plate 13, can return to an initial position under an elastic force of the reset spring 110. This is not strictly limited in this embodiment of this application.

Refer to FIG. 4 again. In some embodiments, the camera lens 2 may be partially accommodated in the through hole 124 of the base 12 of the variable aperture 1 and partially embedded into the variable aperture 1, to reduce a size of the camera module 30 in a thickness direction. This facilitates miniaturization. The camera lens 2 may be further partially accommodated in the inner through hole 131 of the fixed plate 13 of the variable aperture 1. For example, the camera lens 2 may be provided with a top surface 21 and an annular protrusion 22 convexly disposed on the top surface 21, and the annular protrusion 22 can be accommodated in the inner through hole 131 of the fixed plate 13.

For example, the top surface 21 of the camera lens 2 may abut against a bottom surface that is of the fixed plate 13 and that faces the through hole 124, so that the camera lens 2 and the variable aperture 1 are limited in a thickness direction. The camera lens 2 may fit a hole wall of the inner through hole 131 of the fixed plate 13 or fit a hole wall of the through hole 124, so that the camera lens 2 and the variable aperture 1 are limited in the length direction and the width direction.

Figure 21:
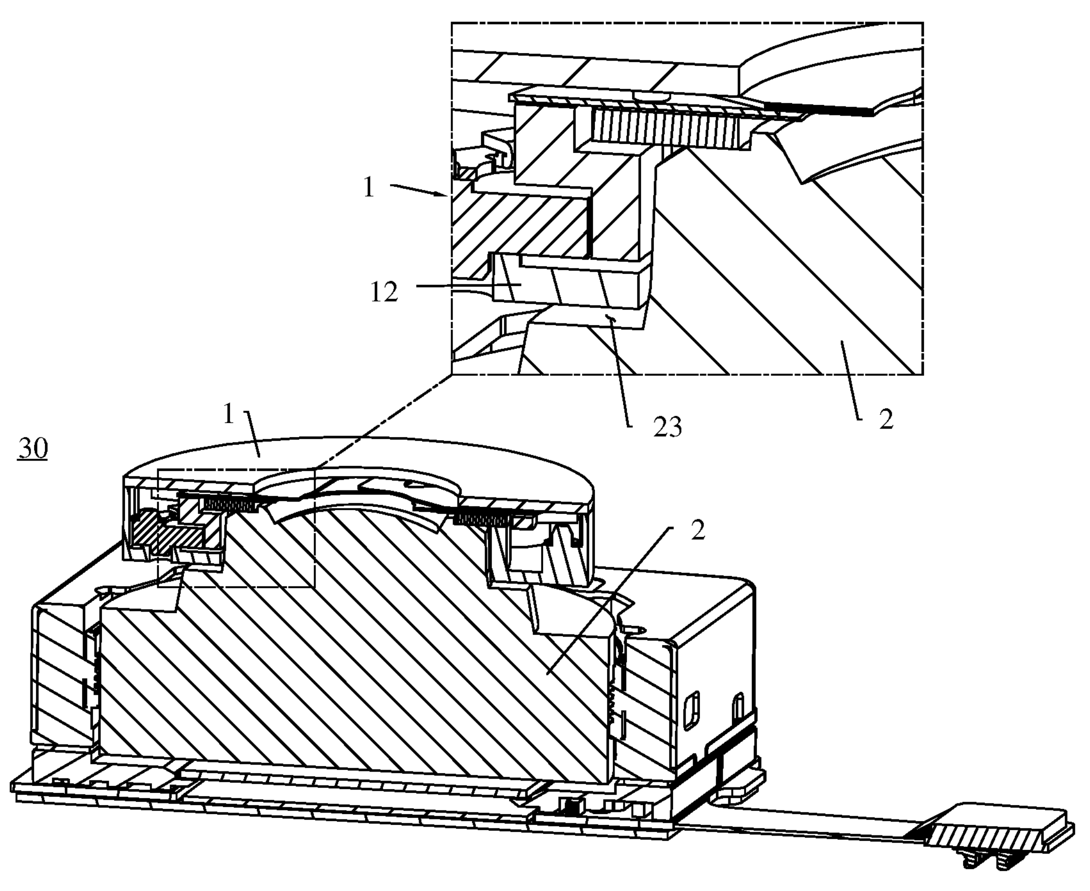
FIG. 21 is a schematic diagram of a structure of the camera module shown in FIG. 1 in some other embodiments.

Refer to FIG. 21. FIG. 21 is a schematic diagram of a structure of the camera module 30 shown in FIG. 1 in some other embodiments. The camera module 30 in this embodiment includes all or a part of features of the camera module 30 in the foregoing embodiments. The following mainly describes a difference between the camera module 30 in this embodiment and the camera module 30 in the foregoing embodiments.

In some embodiments, there may be a step surface 23 on a circumferential side of the camera lens 2, and the step surface 23 is disposed facing the variable aperture 1. When the variable aperture 1 is fastened to the camera lens 2, the base 12 of the variable aperture 1 may be further fixedly connected to the step surface 23, to improve connection stability between the variable aperture 1 and the camera lens 2.

Figure 22:
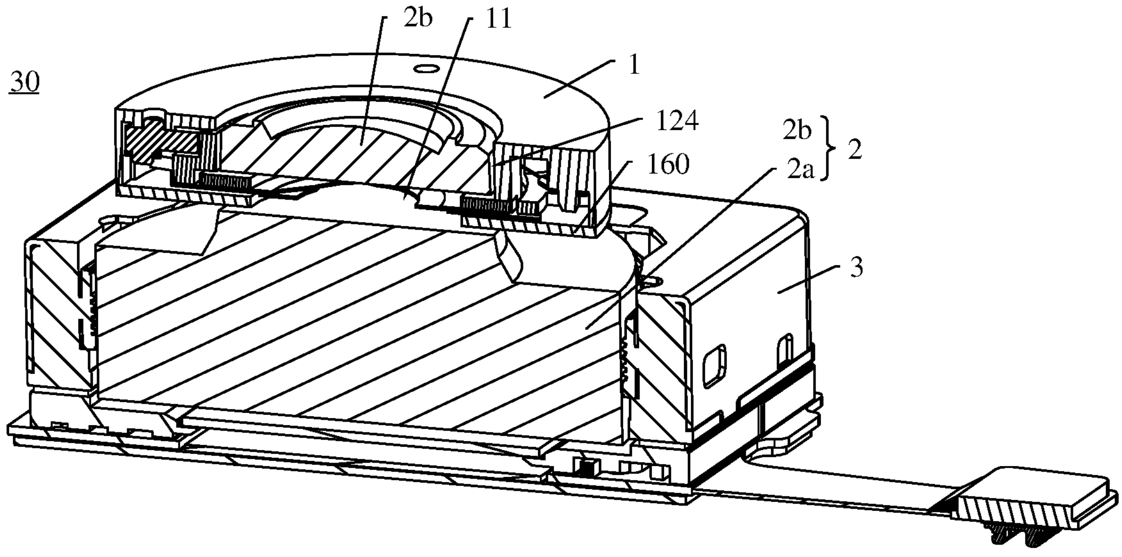
FIG. 22 is a schematic diagram of a structure of the camera module shown in FIG. 1 in still some other embodiments.

Refer to FIG. 22. FIG. 22 is a schematic diagram of a structure of the camera module 30 shown in FIG. 1 in still some other embodiments. The camera module 30 in this embodiment includes all or a part of features of the camera module 30 in the foregoing embodiments. The following mainly describes a difference between the camera module 30 in this embodiment and the camera module 30 in the foregoing embodiments.

In some embodiments, the camera lens 2 includes a first part **2*a* and a second part 2*b* that are coaxially disposed. The first part 2*a* may include a first camera lens barrel and a first lens group installed in the first camera lens barrel, and the second part 2*b*** may include a second camera lens barrel and a second lens group installed in the second camera lens barrel. An optical axis of the second lens group and an optical axis of the first lens group coincide.

The aperture hole 11 of the variable aperture 1 is located between the first part **2*a* and the second part 2*b*. For example, the first part 2*a* may be installed on the motor 3, and the variable aperture 1 may be installed upside down on the camera lens 2. In other words, the cover plate 160 is disposed facing the first part 2*a*, and the second part 2*b* may be accommodated in the through hole 124 of the variable aperture 1. In this embodiment, the aperture hole 11 of the variable aperture 1 is disposed between the first part 2*a* and the second part 2*b*, so that a photographing requirement of the camera module 30 can be better met. For example, the camera lens 2 may implement zooming through the first part 2*a* and the second part 2*b***.

In some other embodiments, the aperture hole 11 of the variable aperture 1 may alternatively be arranged in another position. This is not strictly limited in this embodiment of this application. In some other embodiments, the camera lens 2 may further include more parts. This is not strictly limited in this embodiment of this application.

It ma be understood that in some other embodiments, the variable aperture 1 and the camera lens 2 may also have another fitting structure and position relationship. This is not strictly limited in this embodiment of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A variable aperture, comprising:

a base, wherein a through hole extends through the base;

a fixed plate fixedly connected to the base, wherein the fixed plate is in a ring shape, and an inner through hole of the fixed plate is opposite to the through hole of the base;

a rotation plate rotatively connected to the base and disposed around the fixed plate;

a plurality of blades located on a same side of the fixed plate and the rotation plate, wherein blades of the plurality of blades are annularly distributed and enclose an aperture hole, the aperture hole is opposite to the through hole of the base, and each of the blades of the plurality of blades is rotatively connected to the fixed plate and slidably connected to the rotation plate; and a first shape memory alloy (SMA) wire and a second SMA wire, wherein a first end of each of the first SMA wire and the second SMA wire is connected to the base using a same connection manner, a second end of each of the first SMA wire and the second SMA wire is connected to the rotation plate using a same connection manner, the first SMA wire or the second SMA wire is configured to shrink when power is on, to drive the rotation plate to rotate relative to the fixed plate, and each of the blades of the plurality of blades is configured to rotate relative to the fixed plate and to slide relative to the rotation plate in a manner that an aperture of the aperture hole changes; and wherein a direction in which the first SMA wire shrinks to drive the rotation plate to rotate is opposite to a direction in which the second SMA wire shrinks to drive the rotation plate to rotate.

2. The variable aperture according to claim 1, further comprising a first flipping block, wherein the first flipping block comprises a rotation part, a first connection part, and a second connection part, the rotation part is rotatively connected to the base, the first SMA wire is connected to the first connection part, and the rotation plate is connected to the second connection part; and wherein the first SMA wire is configured to shrink to drive the first connection part to rotate about the rotation part in a manner that the second connection part rotates about the rotation part and flips the rotation plate to rotate relative to the fixed plate.

3. The variable aperture according to claim 2, wherein the second connection part is engaged or in interference fit with the rotation plate.

4. The variable aperture according to claim 2, wherein a spacing between the first connection part and the rotation part is less than a spacing between the second connection part and the rotation part.

5. The variable aperture according to claim 4, wherein the first connection part and the second connection part are separately located on two sides of the rotation part.

6. The variable aperture according to claim 2, further comprising a reset spring, wherein the reset spring is connected to the first connection part and the base.

7. The variable aperture according to claim 2, wherein the base comprises a bottom plate and an inner ring wall, the bottom plate is annular and surrounds the through hole, the inner ring wall is fastened to an inner circumferential edge of the bottom plate, and the inner ring wall is provided with a first notch; and wherein the rotation plate comprises a plate body and a first fitting part fastened to a first side of the plate body, the plate body is disposed opposite to the bottom plate, and the first fitting part is located in the first notch and fits the second connection part.

8. The variable aperture according to claim 7, wherein the fixed plate is fastened to a side that is of the inner ring wall and that backs onto the bottom plate, and the fixed plate covers the first notch.

9. The variable aperture according to claim 1, further comprising a first magnetic member and a second magnetic member, wherein the first magnetic member is fastened to the base and is disposed corresponding to the first SMA wire, and the second magnetic member is fastened to the base and is disposed corresponding to the second SMA wire.

10. The variable aperture according to claim 1, wherein each of the blades of the plurality of blades comprises a first end part and a second end part, each first end part comprises a rotation hole and a guide hole that are spaced, each second end part comprises a first edge, each first edge and the corresponding guide hole are disposed on a same side, and the each first edge is a part of a hole wall of the aperture hole;

wherein the fixed plate comprises a first fixed column, and the first fixed column is inserted into each rotation hole; and wherein the rotation plate comprises a second fixed column, and the second fixed column is inserted into each guide hole and capable of sliding in the each guide hole.

11. The variable aperture according to claim 1, wherein the rotation plate is connected to the base through a roll ball slide rail.

12. The variable aperture according to claim 1, further comprising a reset spring, wherein the reset spring is connected to the base and the rotation plate.

13. A camera module, comprising a camera lens and a variable aperture, wherein the variable aperture is fastened to the camera lens, and an aperture hole of the variable aperture is located on a light transmission path of the camera lens, and the variable aperture comprises:

a base, wherein a through hole extends through the base;

a fixed plate fixedly connected to the base, wherein the fixed plate is in a ring shape, and an inner through hole of the fixed plate is opposite to the through hole of the base;

a rotation plate rotatively connected to the base and disposed around the fixed plate;

a plurality of blades located on a same side of the fixed plate and the rotation plate, wherein blades of the plurality of blades are annularly distributed and enclose the aperture hole, the aperture hole is opposite to the through hole of the base, and each of the blades of the plurality of blades is rotatively connected to the fixed plate and slidably connected to the rotation plate;

a first shape memory alloy (SMA) wire and a second SMA wire, wherein a first end of each of the first SMA wire and the second SMA wire is connected to the base using a same connection manner, a second end of each of the first SMA wire and the second SMA wire is connected to the rotation plate using a same connection manner, the first SMA wire or the second SMA wire is configured to shrink when power is on, to drive the rotation plate to rotate relative to the fixed plate, and each of the blades of the plurality of blades is configured to rotate relative to the fixed plate and to slide relative to the rotation plate in a manner that an aperture of the aperture hole changes; and a reset spring, connected between the first SMA wire and the second SMA wire; and wherein a direction in which the first SMA wire shrinks to drive the rotation plate to rotate is opposite to a direction in which the second SMA wire shrinks to drive the rotation plate to rotate.

14. The camera module according to claim 13, wherein:

the aperture hole is located on a light inlet side of the camera lens; or the camera lens comprises a first part and a second part that are coaxially disposed, and the aperture hole is located between the first part and the second part.

15. The camera module according to claim 13, wherein the variable aperture further comprises a first flipping block, the first flipping block comprises a rotation part, a first connection part, and a second connection part, the rotation part is rotatively connected to the base, the first SMA wire is connected to the first connection part, and the rotation plate is connected to the second connection part; and wherein the first SMA wire is configured to shrink to drive the first connection part to rotate about the rotation part in a manner that that the second connection part rotates about the rotation part and flips the rotation plate to rotate relative to the fixed plate.

16. The camera module according to claim 15, wherein the second connection part is engaged or in interference fit with the rotation plate.

17. The camera module according to claim 15, wherein a spacing between the first connection part and the rotation part is less than a spacing between the second connection part and the rotation part.

18. The camera module according to claim 17, wherein the first connection part and the second connection part are separately located on two sides of the rotation part.

19. An electronic device, comprising:

an image processor; and a camera module, wherein the image processor is in a communication connection to the camera module, and the image processor is configured to obtain image data from the camera module and process the image data;

wherein the camera module comprises a camera lens and a variable aperture, wherein the variable aperture is fastened to the camera lens, and an aperture hole of the variable aperture is located on a light transmission path of the camera lens, and the variable aperture comprises:

a base, wherein a through hole extends through the base;

a fixed plate fixedly connected to the base, wherein the fixed plate is in a ring shape, and an inner through hole of the fixed plate is opposite to the through hole of the base;

a rotation plate rotatively connected to the base and disposed around the fixed plate;

a plurality of blades located on a same side of the fixed plate and the rotation plate, wherein blades of the plurality of blades are annularly distributed and enclose the aperture hole, the aperture hole is opposite to the through hole of the base, and each of the blades of the plurality of blades is rotatively connected to the fixed plate and slidably connected to the rotation plate; and a first shape memory alloy (SMA) wire and a second SMA wire, wherein a first end of each of the first SMA wire and the second SMA wire is connected to the base using a same connection manner, a second end of each of the first SMA wire and the second SMA wire is connected to the rotation plate using a same connection manner, the first SMA wire or the second SMA wire is configured to shrink when power is on, to drive the rotation plate to rotate relative to the fixed plate, and each of the blades of the plurality of blades is configured to rotate relative to the fixed plate and to slide relative to the rotation plate in a manner that an aperture of the aperture hole changes; and wherein a direction in which the first SMA wire shrinks to drive the rotation plate to rotate is opposite to a direction in which the second SMA wire shrinks to drive the rotation plate to rotate.

20. The electronic device according to claim 19, further comprising a reset spring connected between the first SMA wire and the second SMA wire.

* * * * *